United States Patent
Viger et al.

(10) Patent No.: US 8,837,472 B2
(45) Date of Patent: Sep. 16, 2014

(54) METHOD FOR TRANSMITTING A MULTI-CHANNEL DATA STREAM ON A MULTI-TRANSPORT TUNNEL, CORRESPONDING COMPUTER-READABLE STORAGE MEANS AND TUNNEL END-POINTS

(75) Inventors: Pascal Viger, Janze (FR); Stéphane Baron, Le Rheu (FR)

(73) Assignee: Canon Kabushiki Kaisha, Tokyo (JP)

( * ) Notice: Subject to any disclaimer, the term of this patent is extended or adjusted under 35 U.S.C. 154(b) by 1018 days.

(21) Appl. No.: 12/632,663

(22) Filed: Dec. 7, 2009

(65) Prior Publication Data
US 2010/0150154 A1 Jun. 17, 2010

(30) Foreign Application Priority Data
Dec. 12, 2008 (FR) ...................................... 08 58551

(51) Int. Cl.
| | |
|---|---|
| H04L 12/54 | (2013.01) |
| H04L 12/66 | (2006.01) |
| H04L 12/701 | (2013.01) |
| H04J 3/06 | (2006.01) |
| H04L 12/46 | (2006.01) |

(52) U.S. Cl.
CPC ............ *H04L 12/4633* (2013.01); *H04L 12/66* (2013.01); *H04L 45/00* (2013.01); *H04J 3/06* (2013.01)
USPC .......................................... 370/389; 370/503

(58) Field of Classification Search
CPC ....... H04L 45/00; H04L 47/10; H04L 49/351; H04J 3/0685; H04J 3/0664; H04J 3/0632; H04J 3/06
See application file for complete search history.

(56) References Cited

U.S. PATENT DOCUMENTS

| | | | | |
|---|---|---|---|---|
| 5,241,534 | A * | 8/1993 | Omuro et al. ................. | 370/218 |
| 5,745,476 | A * | 4/1998 | Chaudhuri .................... | 370/222 |
| 6,239,793 | B1 * | 5/2001 | Barnert et al. ................ | 715/201 |
| 6,370,200 | B1 * | 4/2002 | Takahashi ..................... | 375/257 |
| 6,775,240 | B1 * | 8/2004 | Zhang et al. .................. | 370/251 |
| 7,643,480 | B2 * | 1/2010 | Liu et al. ....................... | 370/389 |
| 2005/0185587 | A1 | 8/2005 | Klinker | |
| 2005/0237434 | A1 * | 10/2005 | Takatori et al. ............... | 348/725 |

(Continued)

OTHER PUBLICATIONS

U.S. Appl. No. 12/636,680, filed Dec. 11, 2009.

(Continued)

*Primary Examiner* — Marsha D Banks Harold
*Assistant Examiner* — Matthew Campbell
(74) *Attorney, Agent, or Firm* — Fitzpatrick, Cella, Harper & Scinto

(57) ABSTRACT

A method is disclosed for transmitting a multi-channel data stream comprising frames comprising a plurality of channels, the transmitting being done via a multi-transport tunnel from a first tunnel end-point to a second tunnel end-point, the multi-transport tunnel implementing at least one first carrier supporting a transport protocol with acknowledgement and at least one second carrier supporting a transport protocol without acknowledgement.

More specifically, the invention proposes to introduce a delay in the sending of data (<<of high importance>>) via the first carrier as compared with the sending of data (<<of lesser importance>>) via the second carrier. Thus the invention guarantees the order of arrival of channels that are associated with a same piece of synchronization but are transmitted on distinct first and second carriers and come from the separation of a same multi-channel data frame.

24 Claims, 10 Drawing Sheets

(56) References Cited

U.S. PATENT DOCUMENTS

| | | |
|---|---|---|
| 2005/0265397 A1 | 12/2005 | Chapman |
| 2007/0094723 A1* | 4/2007 | Short et al. .................. 726/14 |
| 2007/0183317 A1 | 8/2007 | Vasseur |
| 2009/0034416 A1 | 2/2009 | Baron |
| 2009/0213850 A1 | 8/2009 | Viger |
| 2010/0008245 A1 | 1/2010 | Viger |

OTHER PUBLICATIONS

French Search Report dated Jul. 13, 2009 issued during prosecution of related French application No. 0858551.

* cited by examiner

METHOD FOR TRANSMITTING A MULTI-CHANNEL DATA STREAM ON A MULTI-TRANSPORT TUNNEL, CORRESPONDING COMPUTER-READABLE STORAGE MEANS AND TUNNEL END-POINTS

1. FIELD OF THE DISCLOSURE

The field of the invention is that of communications networks.

More specifically, the invention pertains to a technique for transmitting data packets (also called datagrams) on a tunnel going via a communications network. More specifically, the invention pertains to a technique for transmitting data packets (also called datagrams) on a multi-transport tunnel making it possible to preserve minimum latency while at the same time ensuring transmission of a multi-channel data stream with minimum guaranteed quality in the event of temporary congestion on the Internet.

The democratization of high-bit-rate Internet on the one hand and the emergence of general consumer audiovisual equipment having network connectivity on the other hand are going to create new forms of behavior on the part of users. These new forms of behavior will undoubtedly involve the appearance of individuals belonging to groups of persons having common interests (leisure, family, etc) that we might call "permanently linked" groups. These groups will set up almost permanent connections with other individuals of a same field of interest, setting up audio and/or video communications and sharing all kinds of information (audio, video, photo, text etc).

The technology of Virtual Private Networks (VPN) is offering a worthwhile solution to this expectation. VPN enables real-time transparent communication in a secured way between individuals who share a same field of interest while at the same time using the Internet infrastructure which has low reliability but is inexpensive.

To communicate transparently and overcome the need for non-routable addresses, VPNs use a particular type of encapsulation known as tunneling which creates what is called a tunnel. This operation consists in encapsulating an A-level protocol (a passenger protocol) in a B-level protocol (transport protocol) by means of an encapsulation protocol C. Thus, the transport protocol B processes the passenger protocol A as if payload data were involved.

FIG. 3, described in detail here below, presents an example of packet encapsulation in a VPN of level 2, i.e. of encapsulation in a level-2 tunnel (a level-2 tunnel means that the passenger protocol A is a protocol of the layer 2 of the ISO model which describes the services offered by each of these layers and their interactions).

Tunneling may be used to transport a network protocol on a network that does not support it. It can also be used to provide different types of VPN functions such as for example private addressing.

Tunneling techniques are now increasingly used by remote-access client functions and by home local area networks (LANs).

Here below in the description, we consider, by way of an example, solely level 2 or level 3 tunnels for which the level of the transport protocol B in the ISO model is equal to that of the transport layer (level 4 layer in the ISO model).

VPNs are frequently used to interconnect two LANs in order to create a virtual local area network formed by the union of two original LANs. Secured VPNs include a cryptography and authentication algorithm to guarantee the secrecy of the transported data. A typical VPN configuration based on a tunneling technique is illustrated in FIG. 1 (described in detail here below). In this example, the tunnel end-points or TEPs are not integrated into the gateways. The tunnel is set up between two tunnel end-points and each packet (also called a frame) sent to an apparatus connected to the remote LAN is encapsulated by the local tunnel end-point and then sent to the remote tunnel end-point. For the apparatuses, they are virtually connected to a same LAN. Communication between two apparatuses through the tunnel is called end-to-end communication.

At present VPNs with multiple connection techniques, i.e. tunnels formed by several carriers or channels, are appearing. This technique enables the choice of a first transport protocol, for example for control data, and a second transport protocol, for example for payload data, the two types of data passing through a same tunnel end-point. There are many other possibilities as regards the choice of the transportation protocol for passenger applications stream (for example as a function of the priorities of the passenger streams). The term used then is "virtual channel" of a tunnel formed by numerous channels each having its own transport protocol, it being understood that only the tunnel end-point knows these channels. The choice of the transport protocol can therefore be optimized for each of the channels.

Here below in the description, this type of tunnel shall be called a "multi-transport tunnel".

In the prior art, the Internet protocol (IP) of layer 3 of the ISO model or the TCP/UDP (transmission control protocol/user datagram protocol) protocols of layer 4 of the ISO model are mainly used. Since tunneling technologies based on IP cannot take account of network address translation (NAT) mechanisms and since they are not entirely compatible with the typical tunneling configuration of FIG. 1, we shall (solely by way of an example) here below in the description considered solutions based on the layer 4 (transport layer), i.e. on the TCP or UDP protocol.

The TCP protocol, which is defined by the RFC-793 standard of the IETF (Internet Engineering Task Force)n is a transmission protocol with an automatic repeat request (ARQ) based on the mechanisms of congestion and retransmission control and thus provides for the delivery of each packet to the destination.

The UDP protocol is far simpler and faster protocol which does not take account of the order of the frames and does not manage any acknowledgement.

As specified here above, the TCP protocol was designed to be flexible and work in a wide variety of network communication environments, including slow and fast links, with high latency or links with variable error rates. Although the TCP protocol works for different environments, its performance characteristics (especially the bandwidth) are affected by the characteristics of each communications link used. The performance characteristics of the TCP protocol in terms of bandwidth suffer in environments with lengthy conveyance times and/or having a high error rate.

In the case of the Internet, the connections normally used are of the "best effort" type i.e. the connections do whatever is possible to convey information to their destination, but do so without ensuring a certain quality of service (QoS). Thus, in VPN communications, the transport layer of the tunnel is subjected to high fluctuations in transmission capacities. In particular, the jitter which describes the variation in the time taken to transmit a frame as well as the rate of loss (which describes the number of frames lost during transmission) are two parameters highly disturbed on the Internet in the event of congestion of the network.

The multi-channel sound format is an audio format aimed at approaching natural listening quality. It gives sound a notion of space and thus enables the listener to be surrounded as well as immersed. It makes it possible quite simply to reproduce the event in a cinema hall or at home with all the high emotions of a concert hall, a stadium, an exterior or the theater.

Since recently, multi-channel audio formats such as Dolby Digital or the DTS (Digital Theater System) have become predominant in home cinema systems. Formats typically recognized are the 4.0, 5.1 and more recently the 7.1 formats. For example, the Dolby Digital 5.1 format supports two front speakers, two rear speakers, one center speaker and one low-frequency effects (LFE) speaker. The 7.1 format furthermore adds two additional channels to support two side speakers.

Since a multi-channel stream (such as audio) must be transmitted and rendered in real time, the transport protocol for this stream must provide for delivery with minimum error or loss.

Now, when there is a congestion on the Internet, the intermediate routers may decide to eliminate certain packets in transit in order to reduce congestion and it is impossible to foresee which packets will be eliminated and which ones that will be effectively transmitted. This may have a negative real impact on sound rendering.

Indeed, as described here above, since the TCP protocol is not designed for transporting data in real time, the UDP protocol would be more capable of responding to this need except that it does not provide any stream control mechanism.

This is why the RTP (the real time transport protocol which is a RFC-3550 standard) situated at the level of the application according to the ISO layer uses the underlying UDP transport protocol in order to provide an end-to-end transport function for real-time applications in multicast type network services (i.e. where a message is sent to several intended recipients simultaneously) or unicast type network services (where a message is sent to a single intended recipient).

The UDP protocol is classically made specific for the applications in view and there are several existing formats. For example for audio and video conferences, the format is defined by the RFC-3551 standard, for the transporting of MPED1/2 video streams it is the RFC-2250 standard and for the AC-3 audio stream transport, it is the RFC-4184 standard.

However, it is laid down that for multi-channel sessions, the samples of a same point and time should be in the same RTP packet.

Thus the loss of an RTP packet results in the loss of a time sample for all the channels of the multi-channel stream conveyed.

In order to optimize the bandwidth for the real-time applications to be transmitted on the Internet, the TCRTP (Tunneling Multiplexed Compressed Real-Time Transport Protocol defined by the RFC-4170 standard) is used for the compression and multiplexing of RTP multimedia streams. This is a protocol that acquires no modification of existing RTP applications because the tunneling mechanisms are incorporated into external concentration devices such as Internet gateways.

This TCRTP protocol requires no additional processing of the routers of the global network traversed relies on different standardized protocols such as:— the ECRTP header compression protocol (Enhanced Compressed Real-Time Protocol under the RFC-3545 standard) for the compression of IP/UDP/RTP headers;

the PPP (Point-to-Point Protocol) layer multiplexing protocol, i.e. PPP-MUX, RFC-3153 standard, enabling the aggregation of RTP multiple streams;

the L2TP (Layer Two Tunneling Protocol under the RFC-2661 standard) enabling the creation of "level 2" tunnels in supporting PPP sessions. L2TP tunneling on IP networks uses the UDP protocol and a series of L2TP messages for the management of the tunnel.

Thus, during temporary congestion on the Internet of the RPV tunneling according to the TCRTP protocol, the loss of a packet of the tunnel results in the loss of a time sample of all the multiplexed RTP streams, and this is so for all the channels of each of the streams.

In conclusion, the smallest loss on a TCRTP tunnel has a yet greater effect if each RTP stream were to be transmitted in isolation (outside the RPV tunnel).

There is no system of transport through a tunnel which makes it possible, while preserving minimum latency, to ensure transmission of a multi-channel data stream with minimum guaranteed quality in the event of temporary congestion on the Internet.

2. BACKGROUND OF THE DISCLOSURE

The prior art closest to the invention pertains to a system for the synchronization of multimedia streams in real time. A patent document EP 1775964 A1 (Huawei Technologies Co. Ltd. "Method and device for stream synchronization of real-time multimedia transport over packet network") describes a prior-art system of this kind.

This patent document has a solution for synchronizing two multimedia streams (in this case an audio stream and a video stream) traveling through the Internet.

The proposed solution relies on the addition of two buffers, one for the audio stream and one for the video stream. The invention presented in this patent enables dynamic evaluation of the size of these buffers. To this end, the invention evaluates the time of transfer of each stream by taking the difference between the sending instant and the reception instant and deduces a transfer time therefrom. This difference is then used to define the size of the different buffers.

However, this technique has several drawbacks.

A first drawback lies in the fact that the mechanism described in this document uses two buffer memories of variable size, necessitating temporary storage space to manage these buffers.

A second drawback lies in the fact that the solution described in these documents calls for the implementation of systematic temporary storage of all the frames received. This induces the addition of supplementary latency in addition to that inevitably induced by the traversal of the Internet.

A third drawback lies in the fact that the measurement of the difference of propagation time is done by the difference of mean propagation times measured for each stream (by difference between the instant of sending and the instant of reception). This technique calls for the transmission of a timestamp generally encoded on four bytes, thus introducing additional overhead (or extra bit rate).

3. GOALS OF THE DISCLOSURE

It is a goal of at least one embodiment of the invention to provide a technique of transmission of a synchronized multi-channel stream making it possible, in the event of congestion on a network present on a path taken (such as the Internet) to ensure the transmission of substantial data in order to render a multi-channel stream at the expense of less important data. This mechanism can be used to obtain a rendering of the multi-channel stream with quality higher than that of prior-art systems while at the same time ensuring minimum latency.

This method will be described more specifically in the context of an audio multi-channel application but can be applied to all multi-channel streams in general.

It is another goal of at least one embodiment of the invention to provide a technique of this kind for which the consumption of temporary storage resources is very low.

It is also a goal of at least one embodiment of the invention to provide a technique of this kind that is simple to implement and costs little.

4. SUMMARY

One particular embodiment of the invention proposes a method for transmitting a multi-channel data stream comprising frames comprising a plurality of channels, the transmitting being performed via a multi-transport tunnel from a first tunnel end-point to a second tunnel end-point, said tunnel implementing at least one first carrier supporting a transport protocol with acknowledgement and at least one second carrier supporting a transport protocol without acknowledgement.

This method is remarkable in that it is implemented by the first tunnel end-point performing steps of:

routing the channels of a frame of said multi-channel data stream received by the first tunnel end-point to one of said carriers of the tunnel, as a function of at least one predetermined routing criterion;

supplying one piece of synchronization information with said channels;

obtaining a first piece of feedback information relative to a transmission timing relationship between said first and second carriers;

applying a delay before transmitting said channels routed to the first carrier, said delay being determined as a function of said first piece of feedback information.

This method of transmission relies on the assumption that the time for transmitting data sent on a first carrier supporting a transport protocol with acknowledgement is lengthier then the time for transmitting data sent on a second carrier supporting a transport protocol without acknowledgement. This assumption is especially true in times of congestion. However, to ensure that this basic assumption is always true, the invention relies on a wholly novel and inventive approach for introducing a delay in the sending of data ("of great importance") through the first carrier as compared with the sending of data ("of lesser importance") through the first carrier, these pieces of data having to be rendered in a synchronized way despite the paths taken and the different transfer protocols. The present invention then can be used to guarantee the order of arrival of channels associated with a same piece of synchronization information but transmitted on distinct first and second carriers and coming from the separation of a same multi-channel data frame.

Thus, in the event of congestion on a network taken by the transmission of the data stream, such as the Internet for example, the present invention can be used especially to guarantee the transmission of important data for rendering a multi-channel stream at the expense of less important data transmitted on the second carrier.

Again, through this delay applied to each channel transported by means of the first carrier, this method makes it possible, upon reception by a receiver module (of the second tunnel end-point) of the channels transmitted on the first and second carriers, to overcome the need for a systematic temporary storage of the channels received on the first carrier. The latency is thereby diminished.

Indeed, as described in detail here below, in the receiver module, a temporary storage is done only on the channels received on the second carrier.

Advantageously, said first piece of feedback information is a piece of information on a transmission jitter between said first and second carriers.

Advantageously, said first piece of feedback information is a piece of information on a time period between an instant of reception by the second tunnel end-point via the second carrier of a first set of channels and an instant of reception by the second tunnel end-point via the first carrier of at least one second set of channels, the channels of said first and second sets being associated with one piece of synchronization information.

Thus, the first tunnel end-point can dynamically adjust the delay applied to the channels transmitted on the first carrier so has to ensure that these channels are received after the channels associated with a same piece of synchronization information that are transmitted on the second carrier, to then reconstitute the multi-channel data stream on the receiver side (second tunnel end-point).

In one variant, the first piece of information on retroaction pertains to a jitter measured independently of the channels received by the second tunnel end-point. For example, the jitter is measured by a gateway.

Advantageously, if said time period is above a predetermined threshold, the delay before transmission to be applied is zero and if the time period is below or equal to said predetermined threshold, the delay before transmission to be applied is equal to the sum of the absolute value of said time period and of said predetermined threshold.

Thus, in a simple and systematic way, a minimum delay is ensured between the channels transmitted on the first and second carriers, thus making it possible to always comply with the assumption according to which the time for transmitting data sent on a first carrier supporting a transport protocol with acknowledgement is lengthier then the time for transmitting data sent on a second carrier supporting a transport protocol without acknowledgement According to an advantageous embodiment of the invention, this method further comprises steps of:

obtaining a second piece of feedback information representing a loss rate over the second carrier or a retransmission rate over the first carrier;

withdrawing frames routed to the second carrier as a function of said second piece of feedback information.

Thus, the invention favors the sending of important data to the detriment of less important data in order to limit the impact of congestion on the subsequent rendering of the data stream.

According to an advantageous characteristic of the invention, the piece of synchronization information supplied with a channel is a piece of time-stamp information extracted from said multi-channel data stream.

Thus, through the use of already existing time stamping data, it is not necessary to introduce new data. The bandwidth and the processing time when sending data is thereby improved.

The invention also concerns a method for transmitting a multi-channel data stream comprising frames comprising a plurality of channels, the transmission being performed via a multi-transport tunnel from a first tunnel end-point to a second tunnel end-point, said tunnel implementing at least one first carrier supporting a transport protocol with acknowledgement and at least one second carrier supporting a transport carrier without acknowledgement.

This method is remarkable in that it is implemented by the second tunnel end-point performing steps of:

- receiving, via the first and second carriers, channels of said multi-channel data streams as well as pieces of synchronization information supplied with said channels, the channels of one frame of said multi-channel data stream being supplied with one piece of synchronization information;
- storing in a reception buffer the channels and the pieces of synchronization information received via the second carrier;
- and, upon receiving, via the first carrier, a first set of channels associated with a given piece of synchronization information:
  - extracting from said reception buffer a second set of channels being supplied with said given piece of synchronization information;
  - rebuilding a frame of said multi-channel data stream from said first and second sets;
  - determining a first piece of feedback information relative to a transmission timing relationship between said first and second carriers;
  - transmitting said first piece of feedback information to said first tunnel end-point.

Thus, the invention relies on a wholly novel and inventive approach consisting of the clocking, by the first carrier, of the sending of "important" data to the second tunnel end-point. This clocking associated with the synchronization information overcomes the need for a systematic temporary storage at reception of the channels transmitted on the first carrier. The latency is thereby diminished. The present invention therefore makes it possible to overcome the need for an additional temporary storage space on the second tunnel end-point.

Thus, the first tunnel end-point is permanently informed of the jitter between the first and second carrier. Depending on this jitter, the first tunnel end-point dynamically adjusts the delay of the channel transmitted on the first carrier relative to the channels of the second carrier so as to ensure that the channels transmitted on the first carrier are received after the channels that are associated with a same piece of synchronization information and are transmitted on the second carrier.

Advantageously, said first piece of feedback information is a piece of information on a transmission jitter between said first and second carriers.

Advantageously, said first piece of feedback information is a piece of information on a time period between an instant of reception by the second tunnel end-point of said first set of channels and an instant of reception by the second tunnel end-point of said second set of channels.

Thus, depending on the value of the temporal divergence obtained between the channels received through the second carrier (and associated with a same piece of information on synchronization), the first tunnel end-point dynamically adjusts the delay between the channels transmitted on the first carrier and the channels transmitted on the second carrier (and associated with a same piece of information on synchronization), so as to ensure that the reception of the channels transmitted on the first carrier is taken after the channels transmitted on the second carrier (for channels having the same synchronization information).

According to another particular characteristic, the second tunnel end-point performs steps of: determining a second piece of feedback information pertaining to a loss rate over the second carrier by comparing a number of frame portions of the multi-channel stream received via the first carrier and a number of frame portions of the multi-channel stream received via the second carrier;

transmitting said second piece of feedback information to said first tunnel end-point.

Thus, the first tunnel end-point, depending on this second piece of information on synchronization, is allowed to eliminate certain channels that have to be transmitted on the second carrier in order to limit the bit rate on the tunnel and accelerate the re-absorption of congestion (on which the loss rate depends).

In another embodiment, the invention pertains to a computer-readable storage means readable by computer, storing a computer program comprising a set of instructions that can be executed by a computer to implement a method for transmitting a multi-channel data stream comprising frames comprising a plurality of channels, the transmitting being performed via a multi-transport tunnel from a first tunnel end-point to a second tunnel end-point, said tunnel implementing at least one first carrier supporting a transport protocol with acknowledgement and at least one second carrier supporting a transport protocol without acknowledgement.

This computer-readable storage means is remarkable in that the first tunnel end-point performs steps of:

- routing the channels of a frame of said multi-channel data stream received by the first tunnel end-point to one of said carriers of the tunnel, as a function of at least one predetermined routing criterion;
- supplying one piece of synchronization information with said channels;
- obtaining a first piece of feedback information relative to a transmission timing relationship between said first and second carriers;
- applying a delay before transmitting said channels routed to the first carrier, said delay being determined as a function of said first piece of feedback.

In another embodiment, the invention pertains to a computer-readable storage means readable by computer, storing a computer program comprising a set of instructions that can be executed by a computer to implement a method for transmitting a multi-channel data stream comprising frames comprising a plurality of channels, the transmission being performed via a multi-transport tunnel from a first tunnel end-point to a second tunnel end-point, said tunnel implementing at least one first carrier supporting a transport protocol with acknowledgement and at least one second carrier supporting a transport carrier without acknowledgement.

This computer-readable storage means is remarkable in that the second tunnel end-point performs steps of:

- receiving, via the first and second carriers, channels of said multi-channel data streams as well as pieces of synchronization information supplied with said channels, the channels of one frame of said multi-channel data stream being supplied with one piece of synchronization information;
- storing in a reception buffer the channels and the pieces of synchronization information received via the second carrier;
- and, upon receiving, via the first carrier, a first set of channels associated with a given piece of synchronization information:
  - extracting from said reception buffer a second set of channels supplied with said given piece of synchronization information;
  - rebuilding a frame of said multi-channel data stream from said first and second sets;
  - determining a first piece of feedback information relative to a transmission timing relationship between said first and second carriers;

transmitting said first piece of feedback information to said first tunnel end-point.

The invention also concerns a first tunnel end-point participating in a transmitting of a multi-channel data stream comprising frames comprising a plurality of channels, the transmitting being performed via a multi-transport tunnel from a first tunnel end-point to a second tunnel end-point, said tunnel implementing at least one first carrier supporting a transport protocol with acknowledgement and at least one second carrier supporting a transport protocol without acknowledgement.

According to the invention, the first tunnel end-point is remarkable in that it comprises:
  means for routing the channels of a frame of said multi-channel data stream received by the first tunnel end-point to one of said carriers of the tunnel, as a function of at least one predetermined routing criterion;
  means for supplying one piece of synchronization information with said channels;
  means for obtaining a first piece of feedback information relative to a transmission timing relationship between said first and second carriers;
  means for applying a delay before transmitting said channels routed to the first carrier, said delay being determined as a function of said first piece of feedback information.

Advantageously, said first piece of feedback information is a piece of information on a transmission jitter between said first and second carriers.

Advantageously, said first piece of feedback information is a piece of information on a time period between an instant of reception by the second tunnel end-point via the second carrier of a first set of channels and an instant of reception by the second tunnel end-point via the first carrier of at least one second set of channels, the channels of said first and second sets being associated with one piece of synchronization information.

Advantageously, the first tunnel end-point comprises means for comparison of said time period with a predetermined threshold and enabling said means for applying a delay:
  not to apply a delay before transmission if said time period is above said predetermined threshold;
  to apply a delay before transmission equal to the sum of the absolute value of said time period and of said predetermined threshold if the time period is below or equal to said predetermined threshold.

Advantageously, the first tunnel end-point furthermore comprises:
  means for obtaining a second piece of feedback information representing a loss rate over the second carrier or a retransmission rate over the first carrier;
  means for withdrawing frames routed to the second carrier as a function of said second piece of feedback information.

According to another characteristic, the piece of synchronization information supplied with a channel is a piece of time-stamp information extracted from said multi-channel data stream.

The invention also pertains to a second tunnel end-point participating in a transmitting of a multi-channel data stream comprising frames comprising a plurality of channels, the transmitting being performed via a multi-transport tunnel from a first tunnel end-point to a second tunnel end-point, said tunnel implementing at least one first carrier supporting a transport protocol with acknowledgement and at least one second carrier supporting a transport carrier without acknowledgement.

According to the invention, the second tunnel end-point is remarkable in that it comprises:
  means for receiving, via the first and second carriers, channels of said multi-channel data stream as well as pieces of synchronization information supplied with said channels, the channels of one frame of said multi-channel data stream being supplied with one piece of synchronization information;
  means for storing enabling the storage, in a reception buffer, of the channels and the pieces of synchronization information received via the second carrier;
  means for extracting from said reception buffer a second set of channels being supplied with said given piece of synchronization information, upon receiving, via the first carrier, a first set of channels associated with a given piece of synchronization information;
  means for rebuilding a frame of said multi-channel data stream from said first and second sets;
  means for determining a first piece of feedback information relative to a transmission timing relationship between said first and second carriers;
  means for transmitting said first piece of feedback information to said first tunnel end-point.

Advantageously, said first piece of feedback information is a piece of information on a transmission jitter between said first and second carriers.

Advantageously, said first piece of feedback information is a piece of information on a time period between an instant of reception by the second tunnel end-point of said first set of channels and an instant of reception by the second tunnel end-point of said second set of channels.

Advantageously, the second tunnel end-point furthermore comprises:
  means for determining a second piece of feedback information pertaining to a loss rate over the second carrier by comparing with a number of frame portions of the multi-channel stream received via the first carrier and a number of frame portions of the multi-channel stream received via the second carrier;
  means for transmitting said second piece of feedback information to said first tunnel end-point.

5. BRIEF DESCRIPTION OF THE DISCLOSURE

Other features and advantages of embodiments of the invention shall appear from the following description, given by way of an indicative and non-exhaustive example and from the appended drawings, of which:

6. DETAILED DESCRIPTION OF ILLUSTRATIVE EMBODIMENTS

Here below in the description, the method of the invention is described in more ample detail in the context of a multi-channel audio application but can also be applied to any multi-channel stream in general.

Figure 1:
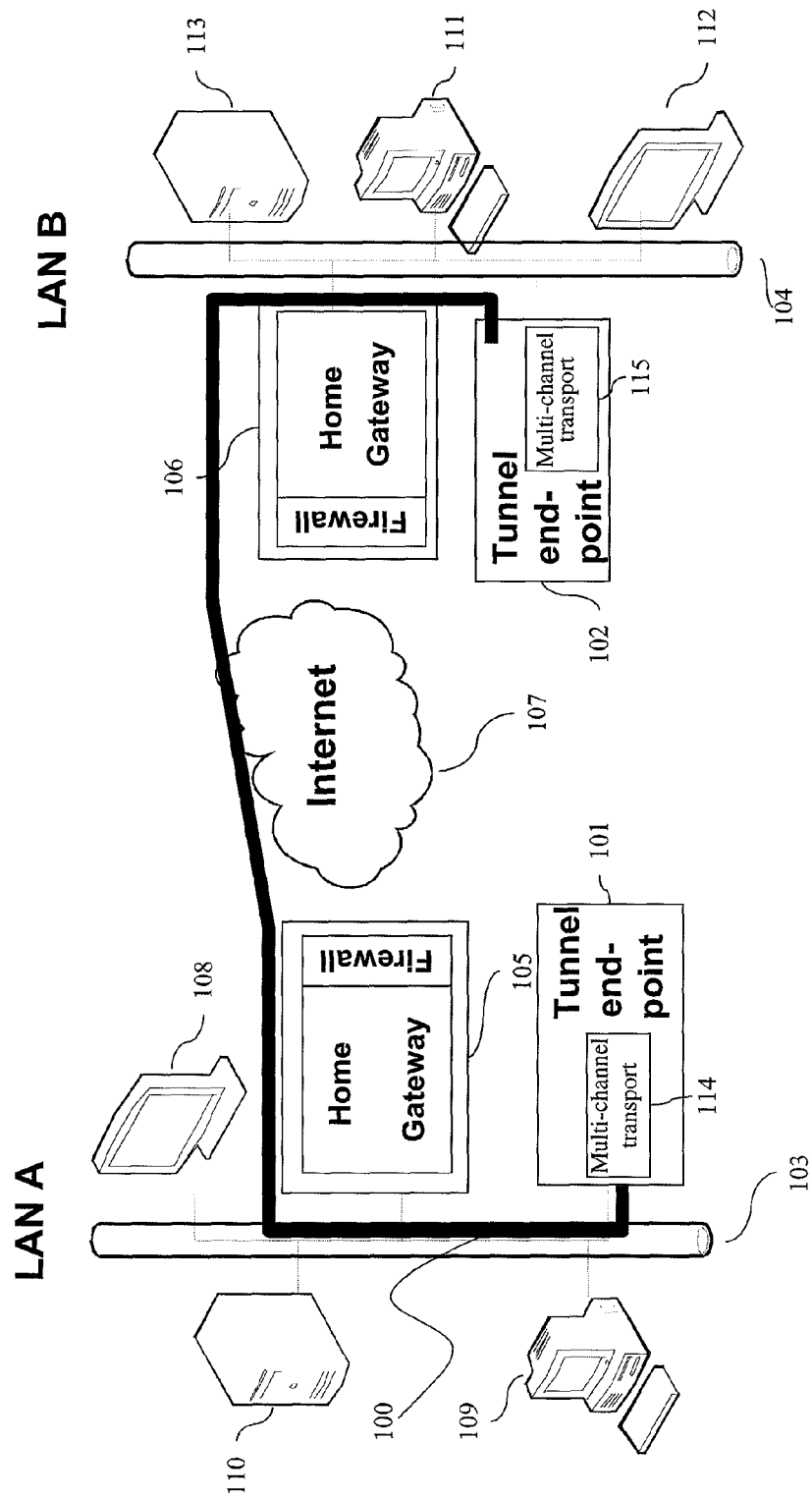
FIG. 1 is a schematic view of a classic configuration of a virtual private network (VPN) implementing a communications tunnel between two local area networks.

FIG. 1 provides a schematic illustration, according to a particular embodiment of the invention, of a virtual private network (VPN) implementing a tunnel 100 between a local tunnel end-point 101 and a remote tunnel end-point 102, through a communications network 107 (the Internet for example). This tunnel 100 connects a LAN network A 103 and another LAN network B 104. Each of the LANs 103 and 104 has a high-bit-rate Internet access apparatus of a home gateway type capable of integrating a firewall 105 and 106, PC type apparatuses 109 and 111, servers 110 and 113 for the storage and distribution of the digital media (of the audio, video and photo type) as well as digital media rendering apparatuses 108 and 112.

A tunnel end-point may be integrated into an audiovisual apparatus such as a digital television set. It can also be present in a PC type apparatus in the form of a program performing the functions associated with it.

Once the tunnel 100 is set up, the apparatuses 108, 109, and 110, connected to the LAN A 103, are capable of communicating with the apparatuses 111, 112 and 113, connected to the LAN B 104. For example, the local client 108 connected to the LAN A 103 can communicate with the server 113 connected to the network LAN B 104.

This FIG. 1 shows a simple communications network with only one tunnel, but it is understood that a same tunnel end-point may have to manage several tunnels (going to an equivalent number of tunnel end-points) to interconnect a first LAN with several other LANs. Furthermore, for the sake of simplification, the figure does not show the infrastructure apparatuses in the Internet such as the Internet routers. For the implementation of the invention, an optimized module for the transport of multi-channel streams 114 or 115 is respectively added in the tunnel end-points 101 or 102.

Figure 2:
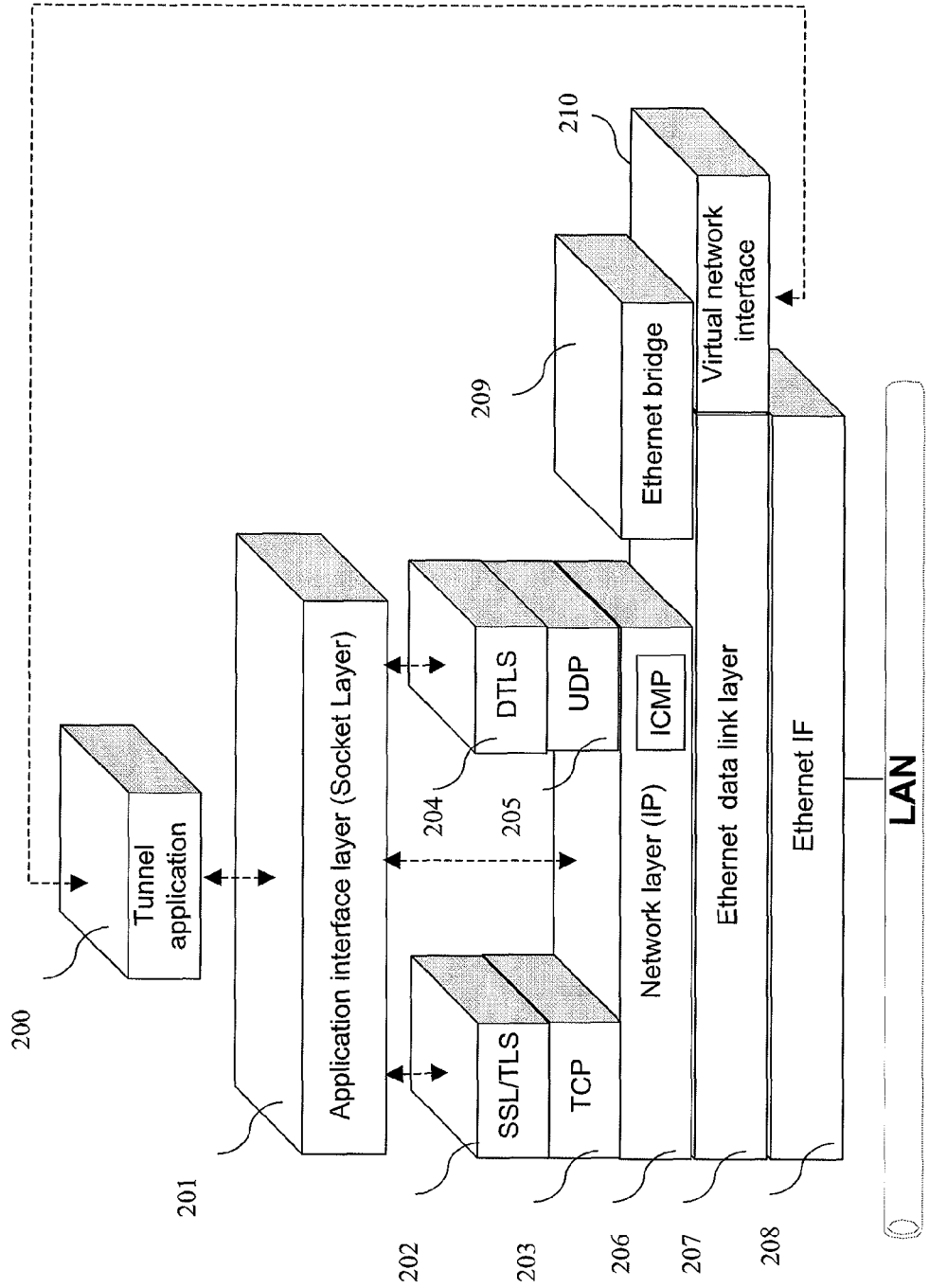
FIG. 2 is a schematic view of a classic layered model of a tunnel end-point in which the method according to a particular embodiment of the invention can be implemented.

FIG. 2 schematically illustrates an example of a classic layered model implemented by a tunnel end-point and in which the invention can be implemented.

This FIG. 2 describes the routing of an Ethernet frame that comes from one of the apparatuses 108, 109, 110 (connected to the LAN B 103) and that will enter the tunnel 100. A layered model describing the protocol layers needed for the implementation of this tunnel 100 is used to describe this routing. In this model, the protocol elements necessary for functions other than the use of the tunnel are not represented. For example, the protocol elements associated with an UPnP architecture, when a first tunnel end-point 101 is integrated into a UPnP apparatus, are not shown.

The tunnel end-point 101 has a Ethernet physical interface 208 which hands over the Ethernet frames coming from one the apparatuses 108, 109, 110 to the link layer 207 for routing toward the network layer 206 (for the Ethernet frames intended for the apparatus comprising the tunnel end-point) or toward the bridge layer 209 for the other Ethernet frames. The bridge layer 209 carries out the classic operations of an Ethernet bridge such as the filtering of Ethernet frames and the relaying of these frames to the appropriate Ethernet output port or ports. The bridge has an Ethernet interface 207 and at least one virtual interface 210, simulating an Ethernet controller, attached to it. A virtual interface 210 is created for each tunnel instantiated by the application 200 to which it gives the Ethernet frames that must travel in transit on the respectively instantiated tunnels. Generally, the protocol of encapsulation of the tunnel represented by the application 200 performs the operations necessary for implementing each tunnel, among them in particular configuration, filtering and encapsulation (formation of a tunnel packet) and the extraction of a frame.

The frames received from the virtual interface 210, after processing by the application 200, are handed over in the form of a packet through an applications interface or socket 201 to a reliable TCP transport protocol 203 or to a non-reliable UDP transport protocol 205, respectively secured by the SSL protocol 202 and the DTLS protocol 204. After processing by a transport protocol to form the tunnel packet, this packet is passed on to the network layer 206. The IP datagram thus formed with the current packet can then be transmitted on the LAN sub-network through the link layer 207 and physical layer 208.

The reception of a frame coming from the tunnel 100 will follow a path in the tunnel end-point that is in reverse to the path presented here above.

Figure 3:
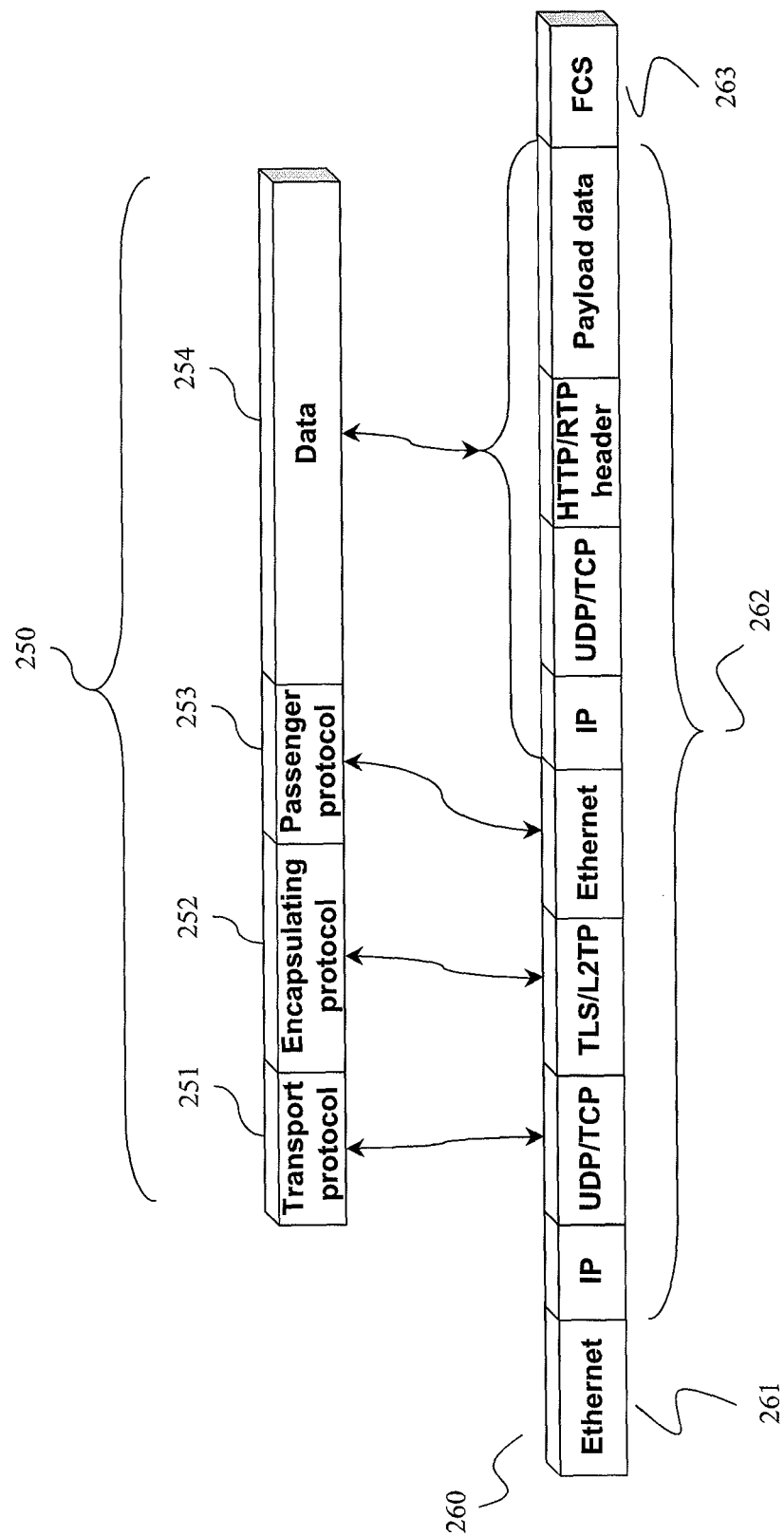
FIG. 3 is a schematic view illustrating an example of a classic format of an Ethernet frame conveying a level 2 tunnel packet.

FIG. 3 shows an example of a classic format of an Ethernet frame 260 in transit for example on the network LAN A 103 of FIG. 1 and comprising an Ethernet header field 261, a first IP datagram 262 itself conveying a level 2 tunnel packet 250 and an FCS (Frame Check Sequence) field 263.

The tunnel packet 250 has four parts:
 a transport protocol header field 251 (namely a TCP or UDP field in this example),
 a header field of the encapsulation protocol 252 (namely L2TP or TLS in this example, described especially in the following documents "IETF RFC3931, "Layer two tunneling protocol—version 3 (L2TPv3)", J. Lau et al, March 2005>> and <<IETF RFC2246, "The TLS Protocol Version 1.0">>),
 a header field of the passenger protocol 253 (namely Ethernet in this example);
 a user data field 254 which itself comprises a second full IP datagram if no fragmentation has taken place in transit from the source apparatus.

Figure 4:
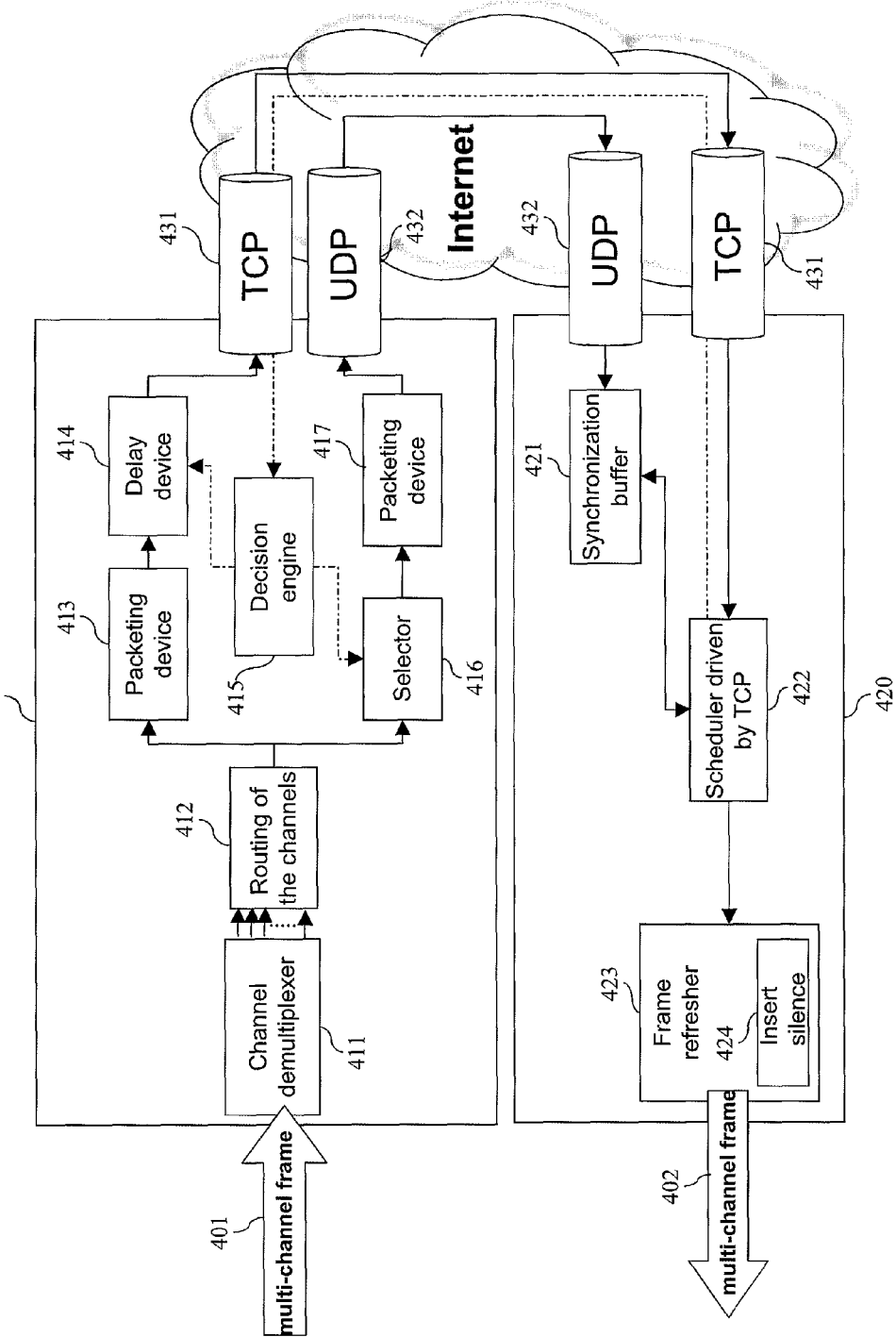
FIG. 4 is a schematic view illustrating a tunnel end-point implementing the present invention according to one particular embodiment of the invention.

FIG. 4 illustrates the implementation of the invention within the multi-channel transport modules 114 and 115 of FIG. 1.

It illustrates the implementation of a sender module 410 and a receiver module 420 connected together by a tunnel using two carriers of different natures, i.e. a carrier 431 having available a transport protocol with acknowledgement (here below called a "reliable carrier") which may be for example a TCP and a carrier 432 having available a transport protocol without acknowledgement (here below called a "non-reliable carrier") which may for example be UDP.

For example, the protocol with acknowledgement is of the SCTP (Stream Control Transport Protocol) type and the protocol without acknowledgement is of the DCCP (Datagram Congestion Control Protocol) type.

To explain one particular embodiment of the invention, this FIG. 4 shall be described in the context of a scenario in which a multi-channel data stream formed by multi-channel stream frames 401 (for example RTP frames of a 5.1 audio stream) is sent by the sender equipment 109 connected to the LAN 103 of FIG. 1 and intended for a receiver device 112 connected to the LAN 104 of FIG. 1. Care shall be taken not to confuse the "stream" frames of a level higher than 4 (transport level) of the OSI model with the TCP or UDP level 4 transport frames. Indeed, a "stream" frame can be fragmented and transported by several transport frames.

In this scenario, each multi-channel "stream" frame 401 is received by a channel de-multiplexer module 411 which will then analyze it.

The different parts of the "stream" frame corresponding to the different channels of the multi-channel stream 401 shall be presented to a routing module of the channels 412 by means of the channel de-multiplexer module 411. In particular, this channel de-multiplexer module 411 presents each audio data block 553 (these data blocks will be described in more ample detail with reference to FIG. 5) to the routing module 412 in indicating for each module the number of the audio channel with which it is associated.

It must be noted that the reception of "stream" frame may necessitate the storage of several "transport" frames should the size of a stream frame be far to great too to be transported by a single transport frame (this is the case for example of certain high definition streams). A "stream" frame 401 will then be fragmented over several "transport" frames on the LAN. In addition to the information concerning the audio blocks, the channel de-multiplexer module 411 gives the IP, UDP and RTP headers of the first "transport" frame received among the frames used on the LAN to convey the different fragments of the current "stream" frame. These information which here below be called "stream information" will be invaluable for a frame refresh module 423 during the retransmission of the refresh RTP frame addressed to the receiver apparatus 112 connected to the LAN 104 of FIG. 1.

Figure 6:
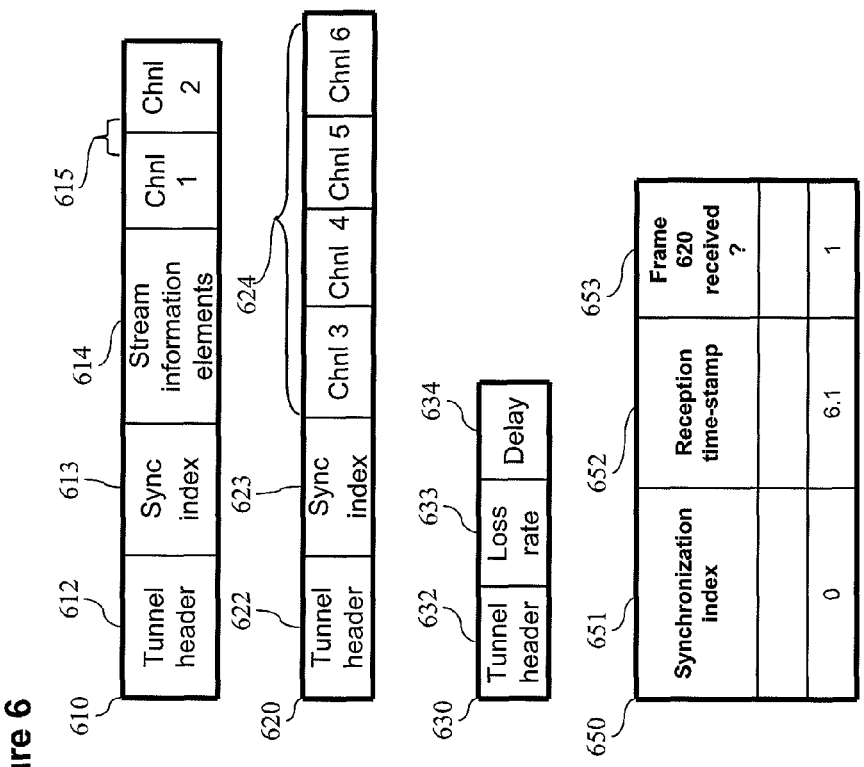
FIG. 6 is a schematic view illustrating a data structure according to a particular embodiment of the invention.

According a particular embodiment of the invention, the channel routing module 412 uses for example a static table 640 as shown in FIG. 6 (described in more ample detail here below in the description). Through this table, the routing module 412 determines that it is important for a given channel of the multi-channel stream to be transmitted without loss. If this is so, the information of this channel will be transported through a tunnel with retransmission on a reliable carrier 431 (with acknowledgement and retransmission if necessary, such as TCP for example). If not, i.e. the transmission of a given channel of the multi-channel stream may undergo losses, then this transmission is done on the non-reliable carrier 432 (with neither acknowledgement nor retransmission, such as UDP for example). This algorithm described in more ample detail here below with reference to FIG. 7A.

At output of the routing module 412 and for retransmission on a reliable carrier 431, a packeting unit 413 fabricates a frame 610 as described with reference to FIG. 6. This frame 610 may possibly be encrypted if the user wishes secured transmission.

At output of the routing module 412 and after passage into a selector 416 (described in more ample detail here below) for retransmission on a non-reliable carrier 432, a packeting unit 417 manufactures a frame 620 as described with reference to FIG. 6. This frame may possibly be encrypted if the user wishes secured transmission then sends it on the non-reliable carrier 432. The mechanisms of the modules 416 and 417 shall be described in greater detail with reference to FIG. 7C.

Then, a delaying unit 414 undergoes a time lag and then sends (on the reliable carrier 431, for example the TCP carrier) the frame 610 manufactured by the packeting unit 413 in order to ensure the reception of a frame 610 having a same index of synchronization (this frame 620 as well as the synchronization index is described in more ample detail here below in the description). The value of any delay to be applied by the delay unit 414 is given by a decision engine 415 whose working is described in more ample detail here below. The mechanisms of the modules 413 and 414 shall be described in greater detail with reference to FIG. 7B.

According to one particular embodiment of the invention, a selector 416 uses the elimination rate given by the decision engine 415 in order to eliminate certain frames 620 which should have be transmitted through the non-reliable carrier in order to limit the bit rate on the Internet link and thus accelerate the absorption of the congestion when such congestion is detected.

According to one characteristic of the invention, the decision engine 415 receives the frame 630 sent out by a scheduler 422 of the reception module 420. By using the information on jitter and loss rate contained in the frame 630, the decision engine 415 determines the new values of the delay to be applied by the delay unit 414 and the rate of elimination to be taken into account by the selector 416.

On the receiver module 420 side, the frames received by the non-reliable carrier 432 are stored in a synchronization buffer 421 whose structure 600 is described with reference to FIG. 6.

The frames received on the reliable carrier 431 for their part are sent to the scheduler 422. This scheduler has two major roles. The first role is that of retrieving, for each frame 610 received, the corresponding frame 620 in a synchronization buffer 421 (i.e. a frame having a same synchronization index), and ridding the synchronization buffer 621 of the outdated frames 620.

The other role of the scheduler 422 relates to retroaction. Indeed, the scheduler 422 is responsible for determining a loss rate "Tp" on the non-reliable carrier (i.e. the rate of lost frames 620) as well as the transmission delay "Rt" (i.e. the relative jitter of the two carriers).

Finally, the scheduler 422 generates a frame 620 intended for the sender tunnel end-point 101. The working of the synchronization buffer 421 and the scheduler 422 is described more specifically with reference to FIG. 8.

The two frames 610 and 620 retrieved by the scheduler 422 are then sent to a RTP frame refresh unit 423 having two functions.

First of all the scheduler 422 uses a piece of stream information 614 (described in more ample detail here below with reference to FIG. 6) of the frame 610 received from the scheduler 422 in order to refresh a valid RTP frame 402 addressed to the receiver apparatus 112. This stream information 614 contains especially the MAC source and destination addresses, the IP source and destination addresses, the UDP source and destination port and the RTP header.

Figure 5:
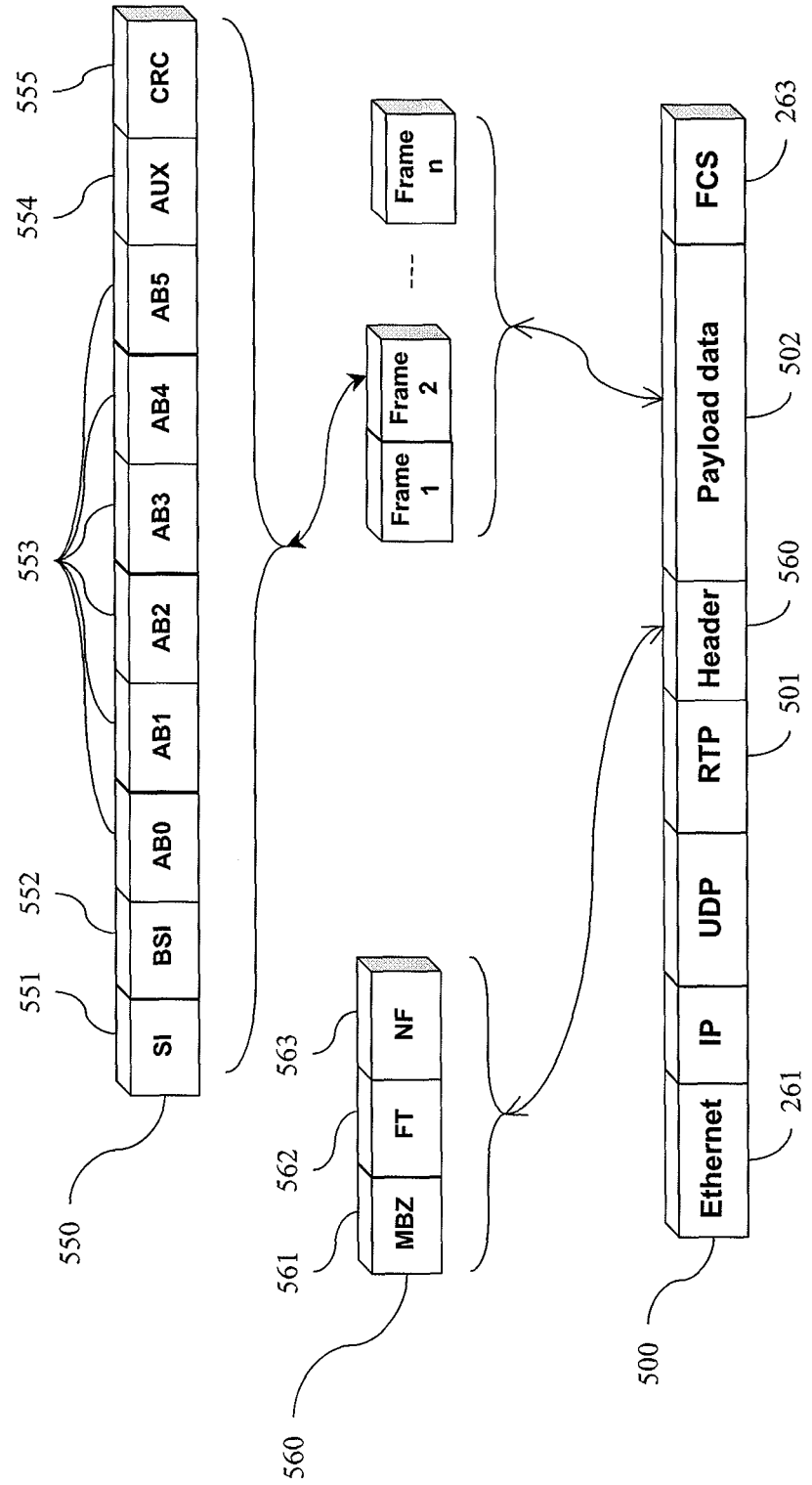
FIG. 5 is a schematic view illustrating an example of a multi-channel stream supported by the mechanisms of the present invention according to a particular embodiment of the invention.

Secondly, it uses audio blocks 615 and if necessary 624 (FIG. 6) respectively carried by the frame 610 and 620 to refresh the part called a payload part of the refreshed RTP frame 402 (FIG. 5). Should the data blocks 624 be absent, a silence insertion module 424 inserts synthetic data (for example data representing a silence) instead of the absent blocks 624. Clearly, other mechanisms for refreshing missing data blocks are possible such as for example the insertion of white noise or again the manufacture of the data blocks by combination of the correctly received blocks. This list presented by way of an example is in no way restrictive.

FIG. 5 provides a schematic illustration of an example of a multi-channel stream 401 supported by the mechanisms of the invention.

The IETF defines several methods of encapsulation of multi-channel multimedia content in the RTP protocol.

Among these methods, we may note the codec (compression-decompression) AC-3 audio methods; or the Dolby digital method formerly called the Dolby AC3 method which is especially the format mostly commonly used for DVD-video disks and is adopted for the broadcasting of land television by the ATSC (advanced television standards committee) for streaming or continuous broadcasting on LAN type networks by the DLNA (digital living network alliance).

There are several existing versions of AC-3 type encoding: 1.0 (mono) which is very rare, 2.0 (stereo), 5.1 (5 channels for the satellite speakers and one channel for the sub-woofer) and 7.1 (seven channels for the satellite speakers and one channel for the sub-woofer).

This is a system of digital encoding with audio data compression that uses the limits of aural perception to efficiently compress a signal and render sound on six independent channels (in the case of a 5.1 type encoding).

A central speaker, generally placed above the screen, serving to broadcast dialogues.

Two audio tracks for the front speakers used to accentuate the sound context coming from the central speaker.

Two channels for the rear speakers used to broadcast noises and the sound environment in order to create ambiance.

One channel for the low frequencies (sub-woofer) used to amplify special effects (explosions, earthquakes etc) (also called "low frequency effects" or LFE).

The RFC-4184 recommendation ("RTP payload for AC-3") stipulates the encapsulation format in a broadcast stream according to the RTP protocol.

A format of an RTP frame 500 conveying AC-3 data frames is shown in FIG. 5.

An RTP header 501 is used to identify the type of data conveyed, especially using a "time-stamp" field relative to the first sample (or frame) of AC-3 data conveyed, and with a "payload type" field identifying the format of the data conveyed (enabling the interpretation of the blocks 560 and 502). It may be recalled that a value of "payload type" field in the 96-127 range indicates a dynamic definition associated with a declaration by a third-party protocol (such as session description protocol (SDP), RFC-2327 standard).

The AC-3 type data stream consists of successive synchronization frames 550 in which each part represents important information for the compression and retrieval of the data.

An "SI" block 551 represents the information on the synchronization. The SI block contains a 40-bit synchronization word used to indicate the start of the AC-3 frame. This word is at the beginning of each frame.

A "BSI" block 552 contains information on the type of data conveyed in the stream. It is only on the basis of this data that it is possible to reconstitute the original samples (determine the number of channels used in addition to the woofer). Less important information is also conveyed, for example language, time, type of service (dialogue, commentary, music etc).

A set of blocks 553 "ABi" (i=1 . . . n) where each block contains audio data from the different channels. Each block consists of 256 sound samples.

An "Aux" block 554 contains supplementary or auxiliary information on the "ABi" block, this information being used if back-up data is needed.

A "CRC" block 555 enables the control of errors in order to verify that the information is not erroneous.

This frame 550 is encapsulated by a two-byte header 560, specific to the AC-3 data encapsulation (also called "payload specific header" according to the RTP protocol). Thus, the payload data zone of the header 560 has an MBZ block 561 formed by zero-setting bits, an "FT" (Frame Type) block 562, indicating the type of frame conveyed (complete or fragmented frame) and an "NF" block 563 indicating the number of AC-3 frames 550 present in the payload data zone.

If the size of an AC-3 frame exceeds the MTU (Maximum Transmission Unit) size as defined under the TCP protocol, this frame may be fragmented at the RTP transport level. According to the recommendations for implementing the RTP protocol, the fragments of this frame are conveyed in order. Thus, the demultiplexer 411 should receive several RTP packets before obtaining each of the channels of the AC-3 multi-channel stream.

The demultiplexer 411 breaks down the channel of the applications stream 401 and thus proposes the identified channels to the decision engine 412 (for example the six audio channels 553 if it is a stream 401 according to the AC-3 audio format of the 5.1 type). An additional virtual channel (not shown) is considered by grouping together the data needed to rebuild the original RTP stream through the refresh unit 424 (this channel may be formed especially by the data elements 560, 550, 552, 554 for an AC-3 audio stream in addition to the RTP time-stamp information of the header 501).

The channel multiplexer module 411 can manage other methods of encapsulation of the multi-channel multimedia content in the RTP protocol, for example those for the following streams:

MPEG2-TS for which the recommendation RFC-2250 recommendation ("RTP payload format for MPEG1/MEPG2 audio and video") describes the method of transport on RTP;

MPEG4 for which the RFC-3016 ("RTP payload format for MPEG-4 audio/visual streams") recommendation describes the transport on RTP.

The type of stream supported by these recommendations may be considered to be a bi-channel stream in the sense that the video and audio parts corresponding to separate channels (or even multi-channel if the audio part is in the AC-3 multi-channel format and not the AAC or MP3 mono-channel format).

We can also note another RTP profile applied to the interactive systems, such as the video conference format according to the RFC-3551 (RTP profile for audio and video conferences with minimal control) recommendation. Although the present invention is not suited to the transport of strict interactive streams, in the context of reliable transport on the Internet with a low latency (for example a Round Trip Time or RTT of less than 50 ms), the retention time in the storage zone of the frame refresh unit 423 (one or two times the RTT) is not critical for the conversation. On the contrary, the quality of conversation in this context will be thereby improved.

FIG. 6 illustrates the different structures of the data implementing for the invention.

A first table 600 table describes a structure adapted to the temporary storage of UDP frames 620 received by a tunnel end-point.

For each frame 620 received, a row is added to the table 600. This row is eliminated upon reception of the frame 610 possessing the same synchronization index.

A column 601 contains the synchronization index 623 of the received frame 620.

A column 602 contains a time-stamp indicating the point in time at which the frame 620 was received. The time-stamp 602 should be precise enough to enable a fine estimation of the difference in transmission "Rt" of two frames (one frame 610 and one frame 620) having a same synchronization index, the frame 610 being transmitted on the TCP channel 431 and the other frame 620 being transmitted on the UDP channel 432.

Typically, a precision of the order of one millisecond may be sufficient for transmission via Internet.

A column 602 contains audio blocks (field 624) or a pointer on the audio blocks of the received frame 620.

The structure of a tunnel frame sent by the module 410 on the TCP transport channel 431, for example through the tunnel end-point 101, is represented by the elements 610.

A field 612 contains the header of the tunnel encapsulation protocol.

A field 613 contains a synchronization index (typically, it may be a counter increased when ever an RTP stream frame 401 is received). This index should be the same in both frames 610 and 620 transporting the audio blocks of a same RTP stream frame 401.

A field 614 contains the information indispensable to the refreshing of a level 2 frame (Ethernet) by the RTP refresh unit 423. This field 614 contains the start of the frame 500 received by the channel demultiplexer module 411 up to and including the RTP payload data header 560.

A field 615 contains a part of the payload data 502 (the major audio blocks).

Once encapsulated in a TCP frame, the frame is 610 is therefore a classic level 2 tunnel frame 260, apart from the fact that a part of the payload data (audio blocks) of the RTP stream frame 401 has been removed to be transmitted on another carrier. This elimination of a part of the audio blocks also offers an advantage since it prevents the fragmentation at the IP level of the frame 260, the overhead linked to the tunneling being compensated for by the elimination of the audio blocks.

It must be noted that it is possible to encrypt the fields 613 to 615 if the encapsulation protocol 622 has a data securing part (such as the use of TLS for example).

The structure of a tunnel frame sent by the module 410 on the UDP transport channel 432, for example by the tunnel end-point 101 is represented by the element 620.

A field 622 contains the header of the tunnel encapsulation protocol.

A field 623 contains the same synchronization index as the field 613 of the frame 610.

A field 624 contains the unimportant audio blocks of the RTP stream frame 401.

It must be noted that it is possible to encrypt the fields 623 of 624 if the encapsulation protocol 622 has a data securing part (such as the use of TLS for example).

The structure of a tunnel frame sent by the module 420 on the TCP transport channel 431, for example by the tunnel end-point 102, is represented by the element 630. This tunnel frame is used by the module 420 to inform the module 410 about the transmission delay Rt, and the observed loss rate Tp.

A field 632 contains the header of the encapsulation protocol of the tunnel. A field 633 contains the loss rate Tp measured (or observed) on the non-reliable carrier 432 (for example UDP).

A field 634 contains the transmission delay Rt.

Figure 8:
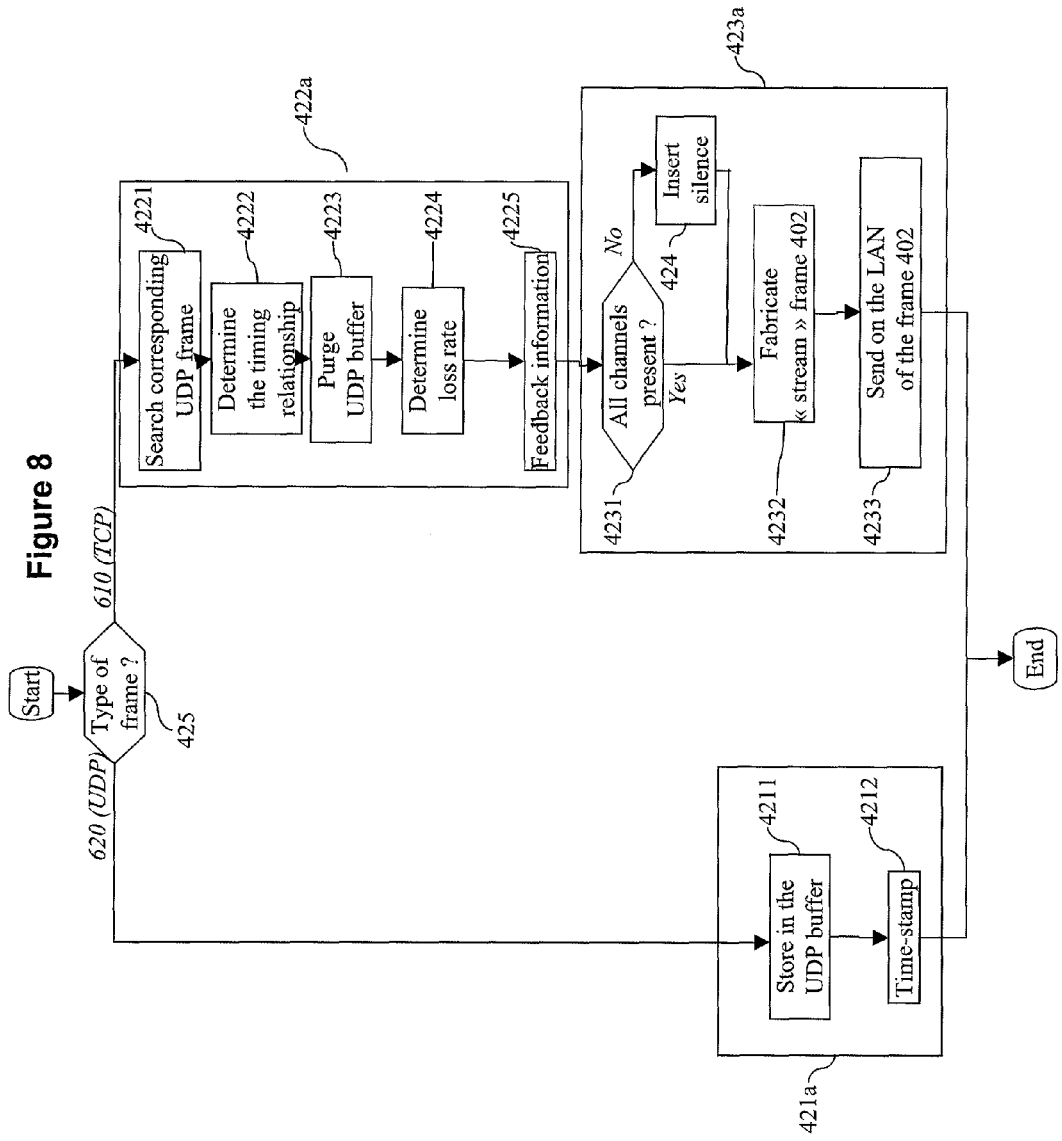
FIG. 8 is a schematic view seen during a reception of a frame coming from a WAN type network according to a particular embodiment of the invention.

The determining of the values of Rt and Tp is described more specifically with reference to FIG. 8.

The second table 640 contains information needed for the static routing of the different channels of a given type of stream (for example AC-3 5.1).

A column 641 contains an indication of the type of multi-channel stream considered (for example the IANA codification is used for the types of content as described in the RFC 3555 standard for the corresponding MIME codes). For example, in the case of an AC-3 multi-channel stream, the type of MIME is an audio MIME and the sub-type is "AC-3".

A column 642 contains the audio mode. This mode determines the number of channels used as well as their order of appearance in a multi-channel frame. This mode will therefore enable identification of the assignment of each channel (channel 1 for the front-right speaker, channel 2 for the front-left speaker etc). In the case of an AC-3 multi-channel stream, this information is contained in the BSI fields 552 of the frame 550 (this information is the concatenation of the "acmod" and "lfeon" fields respectively corresponding to the encoding mode in the AC-3 sense and to a Boolean value indicating whether or not the LFE channel is active. The encoding of the "acmod" and "lfeon" fields of the BSI 552 is described in the ATSC document (Advanced Television Systems Committee): "Digital Audio Compression Standard (AC-3, E-AC-3)".

A column 643 corresponds to the coding of the importance of each channel. Since this information is binary (important or not important), it is advantageous to encode it on one bit. The column 643 therefore represents a set of bits indicating whether a channel is important (value=1) or not (value=0).

The definition of the importance of a channel is done according to at least one predetermined criterion. This criterion may depend on the application in view. For example, in a 5.1 type home cinema application, it may define for example by the fact that the corresponding channels corresponding to the central path, the front right path, and the front left path are important (value=1) and that the others are not important (value=0). This may also be defined as a function of user preferences, for example selected in a manner that depends on the content broadcast. Indeed, the channels considered to be important may for example differ from the viewpoint of the user depending on whether the content is the audio part of a film broadcast continuously (by streaming) or an audio content (musical) that is independent.

For example, in the case of an AC-3 multi-channel stream in mode 5.1, it is possible to indicate that only the first three channels are "important" (these channels correspond respectively to the front-left, front-right and center paths). The corresponding encoding is 11100000 if the encoding is done on 8 bits. Naturally, this is an illustrative and non-exhaustive example. Other choices on the importance of the channels depending on use are possible.

A third table 650 contains the reception time-stamp for the N last frames 610 received by the reception module 420 (N being a fixed value typically equal to 10). This table 950 may advantageously be a stringed circular list, the new inputs thus replacing the older ones.

A field 651 contains the synchronization index 613 of a received frame 610 and the failed 652 contains the time-stamp corresponding to the instant of reception of this same frame 610.

A frame 653 for its part indicates whether the frame 620 of a same index has been received. A value of this field at 0 indicates that the frame 620 has not been received. A value of this field at 1 indicates that the frame 620 has been received.

Figure 7:
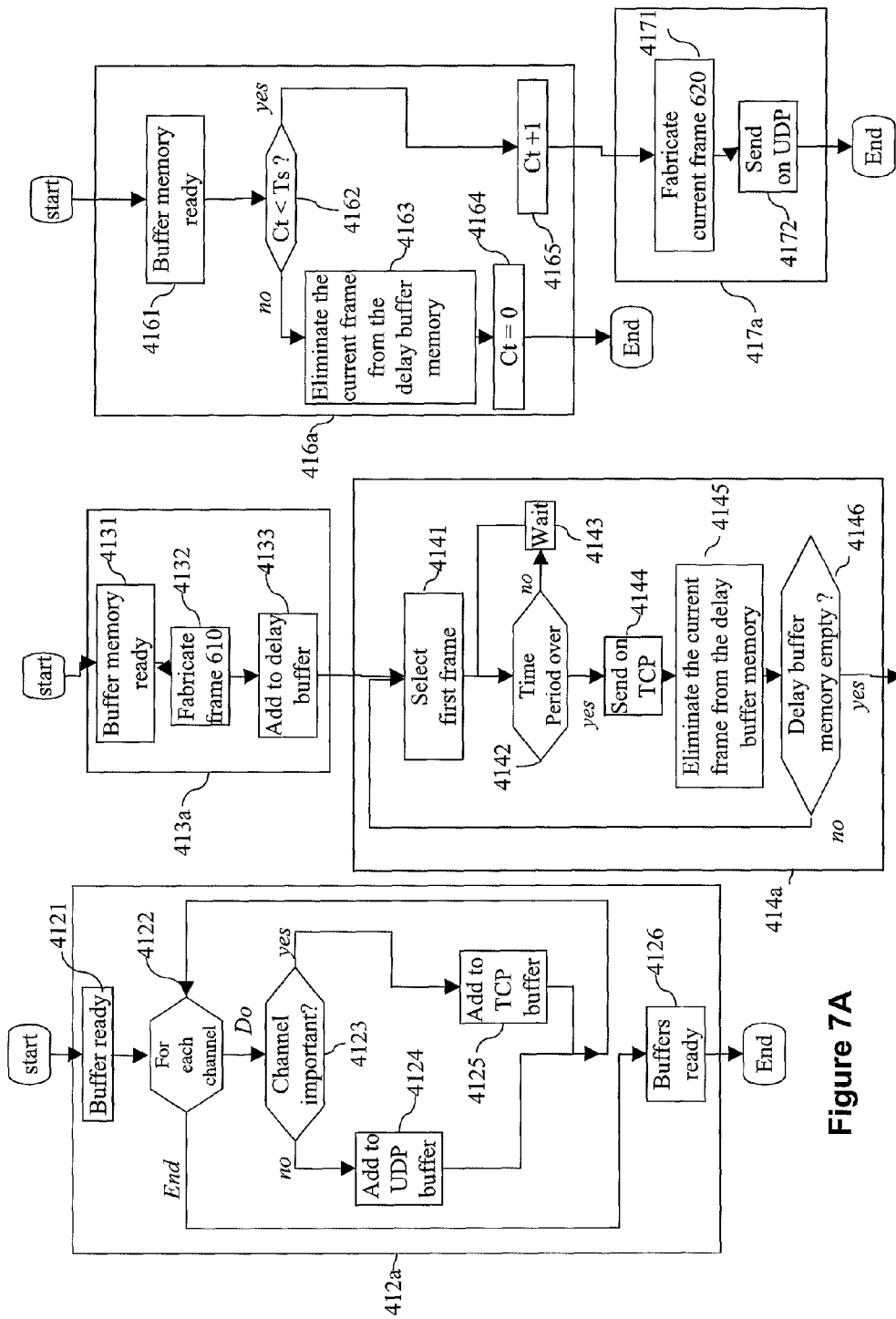
FIG. 7 is a schematic view seen during the sending of a frame on the WAN type network (such as the Internet) according to a particular embodiment of the invention.

Here below in the description, the steps 412a, 413a, 414a, 415a, 416a, 417a, 421a, 422a and 423a of FIGS. 7 to 9 each illustrate an algorithm implemented respectively in the blocks 412, 413, 414, 415, 416, 417, 421, 422 and 423 of FIG. 4.

FIGS. 7a to 7c schematically illustrate the sending of a frame on the WAN (for example the Internet).

These figures describe the mechanisms implemented during the sending of a "stream" frame 401 on the tunnel.

FIG. 7a provides a detailed description of the working of the routing module for the channel 412.

FIG. 7b provides a detailed description of the working of the packeting device 413 and of the delay device 414.

Finally FIG. 7c describes the working of the selector 416 and the packeting device 417 in detail.

The relationships between the elements 412, 413, 414, 416 and 417 are described with reference to FIG. 4.

In FIG. 7a, a step 4121 is used to wait for the flags D1 and D2 (not shown) to be lowered, respectively indicating that the buffer memories associated with a TCP and UDP carriers are ready to receive a new piece of data.

Then, the channel demultiplexer module 411 adds the communicated stream information to the buffer memory associated with the TCP carrier.

A step 4122 then selects the audio blocks 553 one by one, and so long as there remain any such blocks, executes a step 4123.

When the step 4122 determines that there are no longer any audio blocks to be processed, a step 4126 is executed.

The step 4123 determines whether the audio channel encoded in the audio blocks selected at the step 4122 is important. To this end, it examines the table 640 and especially the field 643. The value of the $Q^{th}$ bit of the field 643 (Q being the number of the current audio block in the stream frame 401, hence of the audio of the channel) indicates whether this block is important or not.

If the test of the step 4123 is positive (i.e. if the block is considered to be important), the block is added to the buffer memory associated with the TCP carrier in a step 4125.

If not, the block is added to the buffer memory associated with the UDP carrier 4124.

At the end of the steps 4124 or 4125, the step 4122 is again executed.

The step 4126 determines a synchronization index (for example by incrementing a counter), then adds this index to two buffer memories associated with the TCP and UDP carriers. Finally, the step 4126 positions the two flags D1 and D2 (not shown) to respectively inform the modules 413 and 416 that they have a new piece of data to be processed.

In FIG. 7b, steps 4131 to 4133 provide a detailed description of the algorithms performed by the module 413.

A step 4131 detects whether the flag D1 has been lifted at the step 4126, indicating that the buffer memory associated with the TCP carrier contains a new piece of data.

A step 4132 uses the data contained in the buffer memory associated with the TCP carrier to fabricate a frame 610. To this end, it is enough as the case may be to encrypt the content of the buffer memory associated with the TCP carrier and add the tunnel header 612 thereto.

A step 4133 adds the frame manufactured at the step 4132 to a delay buffer memory. The delay buffer memory is a FIFO which also contains a time-stamp for each frame indicating the time at which the frame was inserted into the delay buffer memory. The time-stamp associated with a delay buffer memory is used especially to determine whether the frame has been sufficiently delayed. The step 4133 then lowers the flag D1 thus indicating that the buffer memory associated with the TCP carrier is again ready to receive new pieces of data. Following their execution of the step 4133, a step 4141 is executed.

The steps 4141 to 4146 provide a detailed description of the algorithm applied by the delay unit 414.

A step 4141 selects the first frame called a "current frame" of the delay buffer memory.

Then, a step 4142 determines whether the current frame should be transmitted immediately or delayed.

A current delay "Rc" of the current frame is defined as the difference between the instant of its insertion into the delay buffer memory (time-stamp associated with the current frame during its insertion into the delay buffer memory) and the current instant.

To this end, a step 4142 compares the current delay "Rc" of the current frame with a delay "R" to be applied to the current frame (the delay R is determined by the decision engine 415 using retroaction information given by the scheduler 422 of the remote tunnel end-point).

If the current delay "Rc" is greater than or equal to the delay "R", the time period is over. The test of the step 4142 is then positive.

If the test of the step 4142 is negative, the algorithm must wait before re-assessing the value of the current delay "Rc" of the current frame. To this end, a "wait" step 4143 is executed. Then the step 4142 is again executed.

If the test of the step 4142 is positive, the current frame must be sent immediately in a step 4144.

The step 4144 sends the current frame 610 on the reliable carrier 431 (for example TCP) addressed to the scheduler 422 of the remote tunnel end-point 102.

A step 4145 then eliminates the current frame from the delay buffer memory.

Then a step 4146 determines whether the delay buffer memory is empty.

If the test of the step 4146 is negative, the step 4141 is again executed.

If not, the algorithm stops.

In FIG. 7c, the steps 4161 to 4165 provide a detailed description of the algorithm executed by the selector 416.

A frame counter "Ct" is defined here. This counter corresponds to the number of frames 620 sent on the non-reliable carrier 432. This frame counter "Ct" is initialized at 0 at the opening of the tunnel. This value "Ct" will enable the selector 416 to determine whether a frame must be sent or eliminated in order to comply with a value "Ts" determined by the decision engine 415, reflecting the rate of elimination to be applied. The value "Ts" is an integer corresponding to the number of consecutive frames that can be transmitted by the selector 416. For example, for an elimination rate of a frame on 10 (10% of loss), the value of "Ts" will be 10. The selector 416 therefore lets through 10 frames, and the $11^{th}$ will be eliminated and then the counter "Ct" will go back to 0. It must be noted that a value of "Ts" equal to 0 indicates that no frame must be eliminated. This corresponds to the normal case.

A first step 4161 detects whether the flag D2 has been lifted at the step 4126, indicating that the buffer memory associated with the UDP carrier contains a new piece of data.

A step 4162 determines whether the counter Ct is strictly below Ts.

If the test of the step 4162 is positive, the frame can be sent and the counter Ct is incremented by 1 in a step 4165. Following the execution of the step 4165, a step 4171 is executed.

If the test of the step 462 is negative, the frame contained in the buffer memory associated with a UDP carrier is eliminated in a step 4163 and will therefore not be sent. Then the counter Ct is reset at 0 through a step 4164.

The steps 4171 to 4172 provide a detailed description of the algorithm applied by the packeting unit 417.

The step 4171 uses the data contained in the buffer memory associated with the UDP carrier to fabricate a frame 620. To this end, it is sufficient as the case may be to encrypt the content of the buffer memory associated with the UDP carrier and add the tunnel end-point 622 thereto.

Finally a step 4172 sends the current frame 620 on the non-reliable carrier 432 addressed to the synchronization buffer 421 of the remote tunnel end-point 102 and then lowers the flag D2 thus indicating that the buffer memory associated with the UDP carrier is again ready to receive new data.

FIG. 8 illustrates an algorithm for receiving a frame coming from the WAN (such as the Internet).

FIG. 8 provides a detailed description of the processing operations applied by the different components of the reception module 420 during the reception of a frame 610 or 620 on one of the carriers 431 or 432 of the tunnel.

A first step 425 determines the type of frame received from the Internet called a current frame here below in the description.

If the current frame is a frame 620, a step 4211 is executed.

If the current frame is a frame 610, a step 4221 is executed.

The steps 4211 and 4212 describe the algorithm performed by the synchronization buffer 421 upon reception of a frame 620.

After a decryption if any of the current frame, the step 4211 inserts a row into the table 600 and fills in the fields 601 and 603 respectively with the fields 623 and 624 of the current frame 620.

The step 4212 attaches value to the field 602 (of the row added to the table 600 at the step 4211) with the time-stamp value representing the current instant. Following the execution of the step 4212, the algorithm is terminated.

The steps 4221 to 4225 provide a detailed description of the algorithm performed by the scheduler 422 at the reception of a frame 610.

The step 4221 traverses or scans the table 600 in search of a stored frame 620 for which the synchronization index 601 is identical to the index 613 of the current frame.

If the search is positive, the field 603 of the table 600 is added to the current frame thus complementing the number of audio channels. The field 653 of the table 650 corresponding to the index of the current frame is also taken to 1 to indicate that this frame is complete.

Then, a step 4222 determines the maximum delay observed between the reception of the frames 610 and 620 for a same index. To this end, the delay "R" is defined according to the following formula:

$$R=\text{TSTCP}(\text{Min}(\text{received UDP}))+\text{TSudp}(\text{Min}(\text{received UDP})).$$

"Min (received UDP)" indicates the smallest synchronization index "Ism" present in the buffer 600. This index may correspond to a frame 620 that has already arrived and for which the frame 610 of a same index has not yet arrived or on the contrary to a frame 620 that has arrived "too late", i.e. after the frame 610 of a same index has been processed.

The term "TSTCP (In)" corresponds to the time-stamp of the TCP frame whose synchronization index In has become a parameter. This value is obtained by scanning the table 650 of the last TCP frames received.

The term "TSudp (In)" corresponds to the time-stamp of the UDP frame for which the synchronization index IN has become a parameter. This value is obtained by traversing the table 600.

If the traversing or scanning of the table 650 has not made it possible to find the index "Ism" it means that the frame 610 index "Ism" has not yet been received. The value of R is then unchanged (the proceeding value determined during the arrival of the frame 610 proceeding the current frame is kept). If not, the value of R is reassessed according to the formula referred to here above.

If the value of R is positive, it means that the frame 620 corresponding to the index "Ism" has been received before the frame 610 corresponding to this same index.

In this case, everything is fine since the basic assumption has been met.

If the value of "R" is negative, it means the frame 620 index "Ism" has arrived after the same index frame 610. The frame 620 index "Ism" is therefore delayed by the value "R".

A step 4223 step then cleans the table 600 by eliminating all the rows for which the index is smaller than the greatest index of the table 650 of the last frame 610 received. These rows correspond to frames 620 that have arrived after the processing of the same index frame 610. The step 4223 also eliminates the frame 620 from the table 600 having the same index as the current frame if it exists. Furthermore, during an elimination of a row of the table 600 during the step 4223, the value of the field 653 of the row of the table 650 whose index is the same as that of the eliminated row is taken to 1 indicating that the corresponding frame 620 has been received (even if it is delayed).

A step 4224 determines the loss rate. This number corresponds to the sum of the values of all the fields 653 of the table 650, i.e. the number of frame 620 received on the N last frames 610 received (N being defined with reference to FIG. 6).

A step 4225 fabricates a frame 630 in giving the fields 633 and 634 respectively the current values of "Tp" and "R".

Following the execution of the step 4225, a step 4231 is executed.

The steps 4231 to 4233 provide a detailed description of the algorithm performed by the frame refresh unit 423.

The step 4231 is used to determine whether a frame 620 has been received with an index equal to that of the current frame 610. To this end, the step 4231 examines the field 653 of the table 650 for the index row equal to index of the current frame.

If the test of the step 4231 is negative, it means audio channels are missing and the silence insertion module 424 (or more generally synthetic data insertion module 424) is implemented to complete the missing audio channels. Possibilities of implementing this module 424 are described with reference to FIG. 4.

If the test of the step 4231 is positive, or at the end of the implementation of the module 424, a step 4232 is executed.

The step 4232 fabricates a valid "stream" frame by using the content of the current frame 610 and the corresponding frame 620 if any, or of the complement fabricated by the module 424. The step especially uses the fields 614, 615 and 624. Through the information contained in the fields 614, 625 and 624, the step 4232 generates a valid RTP stream frame 402.

A step 4233 uses the information of the field 614 of the current frame (especially the MAC source and destination addresses as well as the IP source and destination addresses as well as the UDP source and destination ports) to send the stream frame generated at the step 4232 to the receiver apparatus 112.

Figure 9:
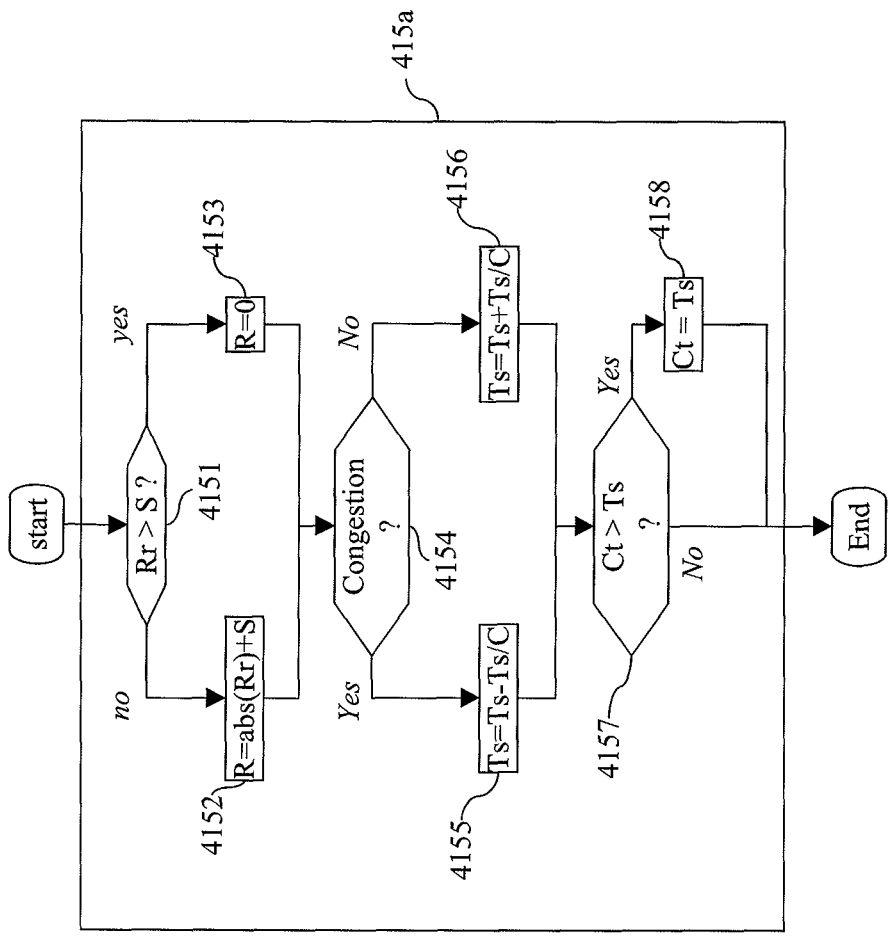
FIG. 9 is a schematic view seen during the reception a retroaction frame according to a particular embodiment of the invention.

FIG. 9 illustrates an algorithm for receiving a retroaction frame by the decision engine 415.

The purpose of the decision engine 415 is to provide the values of "R" (delay to be applied by the delay unit 414) and "Ts" (value relative to a rate of elimination to be applied by the selector 416).

Upon reception of a retroaction frame 630 sent by the scheduler 422 of the remote tunnel end-point, a step 4151 is executed.

A step 4151 determines whether the value "Rr" of the delay received is greater than a threshold "S". This value "Rr" corresponds to the field 634 of the current retroaction frame 630.

The threshold "S" corresponds to a fixed safety value by which it is possible to prevent the frame 620 by arriving late relative to the frame 610 of a same index. Typically, this value may be equal to some milliseconds (for example 5 milliseconds).

At the step 4151, if the value "Rr" is smaller than the minimum lead "S", it means that:
  either the lead of the frame 620 on the frames 610 is very small, i.e. this is the case where the value of "Rr" is positive;
  or the frame 620 are delayed with respect to the frame 610, i.e. this is the case where the value of "Rr" is negative.

Should the test of the step 4151 be positive (i.e. when the value of "Rr" is greater than the minimum lead "5"), there is no reason to apply a delay to the sending of the frame 610. The step 4153 is then executed to position the value of the delay "R" at 0.

If the test of the step 4151 is negative, a step 4152 is executed.

The step 4152 positions the new value of the delay "R" according to the following formula:

$R=Abs(Rr)+S$, where Abs(Rr) designates the absolute value of Rr.

The delay R is therefore positioned with an additional margin "S".

At the end of the execution of the steps 4152 or 4153, a step 4154 is executed.

The step 4154 determines whether there is a congestion in progress on the reliable table 431. To this end, it may for example examine the re-transmission rate on the reliable carrier. If this rate exceeds a given threshold (for example 1%), the step 4154 is positive and a step 4155 is executed. If not, a step 4156 is executed.

In one variant, it may for example examine the loss rate observed by the remote tunnel end-point and given by the remote tunnel end-point in the field 633 of the message 630. The difference between these two rates gives the real loss rate at the second carrier (the first carrier having available a protocol with acknowledgements and re-transmissions if necessary).

The step 4155 executed in the event of congestion of the reliable carrier will increase the rate of elimination to be applied by the selector 416, thus reducing the bit rate on the Internet, and therefore favoring the absorption of congestion (because the two carriers 431 and 432 share the same Internet link). The increase in the elimination rate is proportional to a fixed coefficient "C" which for example may be equal to 1% (at each reception of a retroaction frame, and in the event of congestion, the elimination rate will be increased by 1%).

The term "Ts" corresponds to the number of successive frames which may be sent by the selector 416 without elimination. If the elimination rate increases by 1%, Ts must diminish by 1%. Consequently, the step 4155 applies the following formula to determine the new value Ts from the previous value of Ts:

$Ts=Ts-Ts/C$ (the minimum value of Ts being equal to 0).

If the test of the step 4154 is negative, there is no congestion or no longer any congestion, and the value of Ts can then be increased gradually. A step 4156 therefore applies the following formula to determine the new value of Ts:

$Ts=Ts+Ts/C$ (the maximum value of Ts being for example equal to twice the congestion window of the reliable carrier).

Other methods of progression of the value Ts are possible and within the scope of those skilled in the art.

At the end of the steps 4155 or 4156, a step 4157 is executed.

The step 4157 determines whether the counter <<Ct>> of consecutive frames sent without loss is at a value greater than the new value of <<Ts>>. If this is the case, a step 4158 positions the counter Ct at the new value of Ts.

If the test of the step 4157 is negative, or when the step 4158 ends, the algorithm stops.

Figure 10:
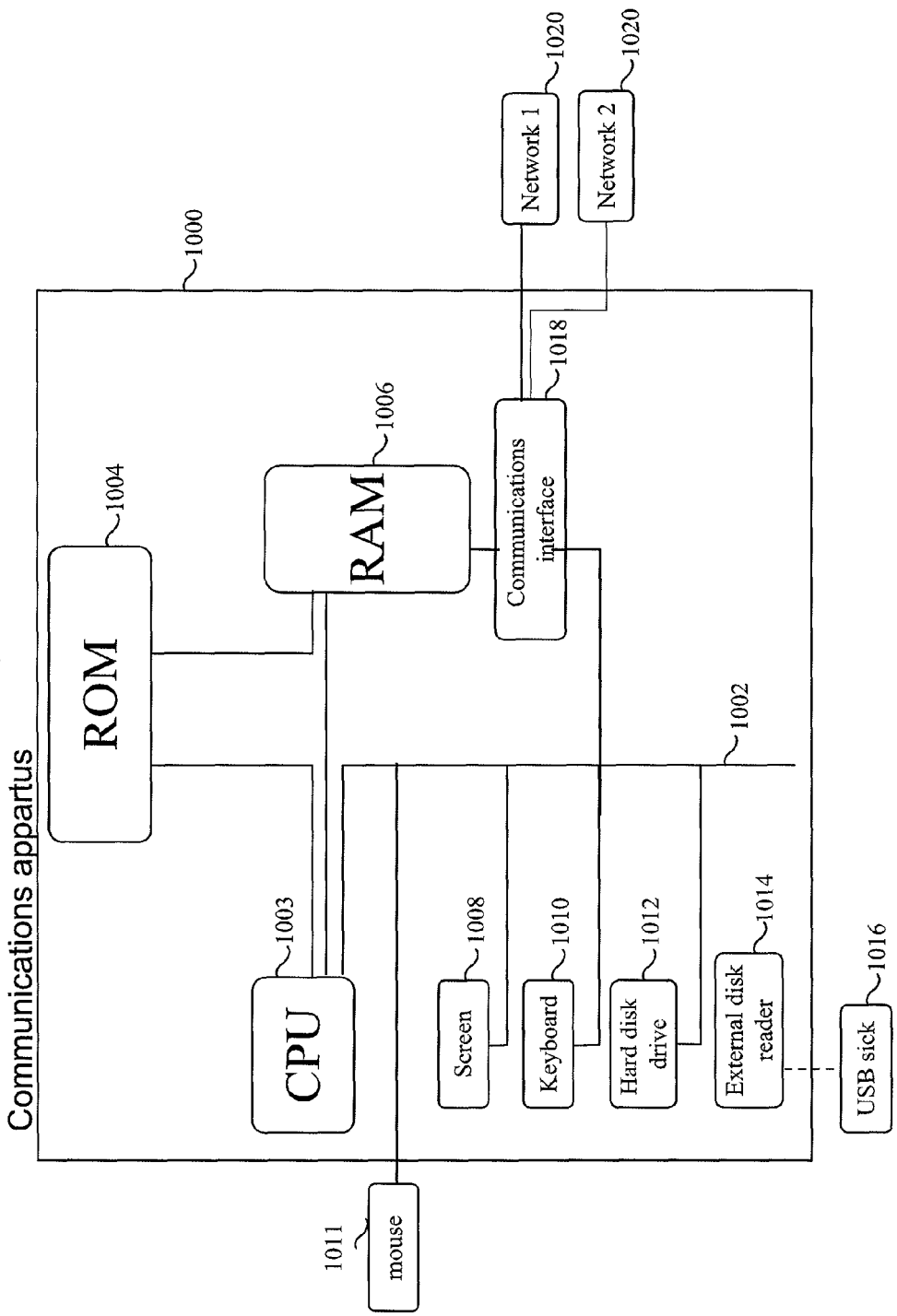
FIG. 10 is a schematic view of a device according to a particular embodiment of the invention.

FIG. 10 schematically illustrates a device according to a particular embodiment of the invention.

An apparatus implementing the invention is for example a generic communications device 1000.

For example, the tunnel end-point 101 or 102 mentioned here above with reference to FIG. 1 is identical to the generic device 1000.

This generic device 1000 may be connected in particular to any means for the storage of images, videos or sound connected to a graphic card and delivering multimedia data to the generic device 1000.

Thus, the generic device 1000 has a communications bus 1002 to which the following are connected:
  a central processing unit 1003 (for example a microprocessor referenced CPU or central processing unit);
  a read-only memory 1004 referenced ROM that could comprise the above-mentioned software program or programs and is referenced Prog;
  a random-access memory 1006 (cache memory referenced RAM) comprising registers suited to recording variables and parameters created and modified in the course of the execution of the above-mentioned program;
  a communications interface 1018 linked to at least two communications networks 1020, for example the local area network 103/104 and the Internet 107, the interface being capable of transmitting and receiving data with these networks.

The generic device 1000 also has the following (but this is optional):
  a screen 1008 used to view the data and/or serve as a graphic user interface with the network administrator which could interact with the programs according to the invention using a keyboard 1010 or any other means such as a pointing device, for example a mouse 1011 or an optical pen or light pen;
  a hard disk drive 1012 capable of comprising the program or programs "Prog";

The communications bus 1002 enables communications and interoperability between the different means included in the generic device 1000 or connected to this device.

More generally, through the communications bus 1002, the central processing unit 1003 can communicate instructions to any device included in the generic device 1000 directly or by means of another device of the generic device 1000.

The executable code of each of the software programs mentioned here above enabling the generic device 1000 to implement the method can be stored for example in the hard disk drive 1012 or in the read-only memory 1004.

The central processing unit 1003 controls and directs the execution of the instructions or portions of executable code of the program or programs according to the invention. When the equipment is powered on, the program or programs which are stored in a non-volatile memory (for example the hard disk drive 1012 or the read-only memory 1004) are transferred to the random-access memory 1006, which will then contain the executable code of the program of the invention, as well as registers to memorize the variables and parameters needed to implement the methods according to the invention.

It must be noted that the communications apparatus comprising the device according to the invention can also be a programmed apparatus. This apparatus then contains the code of the computer program or programs, for example hard-wired into an applications-specific integrated circuit (ASIC).

The invention claimed is:

1. A method for transmitting a multi-channel data stream comprising frames comprising a plurality of channels, the transmitting being performed via a multi-transport tunnel from a first tunnel end-point to a second tunnel end-point, said tunnel implementing at least one first carrier supporting a transport protocol with acknowledgement and at least one second carrier supporting a transport protocol without acknowledgement, wherein the first tunnel end-point performs the steps of:
determining, for each channel of a given frame of the multi-channel data stream received by the first tunnel end-point, based on a predetermined routing criterion, whether the channel is to be routed to the first carrier or to the second carrier of the multi-transport tunnel;
routing channels of the frame of said multi-channel data stream determined in the determining step to be routed to the first carrier to said first carrier of the multi-transport tunnel and routing channels of the frame of said multi-channel data stream determined in the determining step to be routed to the second carrier to the second carrier of the multi-transport tunnel;
supplying one piece of synchronization information with said channels;
obtaining a first piece of feedback information relative to a transmission timing relationship between said first and second carriers; and
applying a delay before transmitting said channels routed to the first carrier, said delay being determined as a function of said first piece of feedback information.

2. The method according to claim 1, wherein said first piece of feedback information is a piece of information on a transmission jitter between said first and second carriers.

3. The method according to claim 1, wherein said first piece of feedback information is a piece of information on a time period between an instant of reception by the second tunnel end-point via the second carrier of a first set of channels and an instant of reception by the second tunnel end-point via the first carrier of at least one second set of channels, the channels of said first and second sets being associated with one piece of synchronization information.

4. The method according to claim 3, wherein:
if said time period is above a predetermined threshold, the delay before transmission to be applied is zero; and
if the time period is below or equal to said predetermined threshold, the delay before transmission to be applied is equal to the sum of the absolute value of said time period and of said predetermined threshold.

5. The method according to claim 1, wherein the first tunnel end-point further performs the steps of:
obtaining a second piece of feedback information representing a loss rate over the second carrier or a retransmission rate over the first carrier; and
withdrawing frames routed to the second carrier as a function of said second piece of feedback information.

6. The method according to claim 1, wherein the piece of synchronization information supplied with a channel is a piece of time-stamp information extracted from said multi-channel data stream.

7. A method for transmitting a multi-channel data stream comprising frames comprising a plurality of channels, the transmission being performed via a multi-transport tunnel from a first tunnel end-point to a second tunnel end-point, said tunnel implementing at least one first carrier supporting a transport protocol with acknowledgement and at least one second carrier supporting a transport carrier without acknowledgement, wherein the second tunnel end-point performs the steps of:
receiving, via the first and second carriers, channels of said multi-channel data streams as well as pieces of synchronization information supplied with said channels, the channels of one frame of said multi-channel data stream being supplied with one piece of synchronization information by the first tunnel end-point, wherein for each received channel, said first tunnel end-point determines, for each channel of a given frame of the multi-channel data stream, based on a predetermined routing criterion, whether the channel is to be routed to the first carrier or to the second carrier of the multi-channel transport tunnel, and wherein the first tunnel end-point routes channels of a frame determined to be routed to the first carrier to the first carrier of the multi-channel transport tunnel and routes channels of a frame determined to be routed to the second carrier to the second carrier of the multi-channel transport tunnel, and supplies the one piece of synchronization information with the channels;
storing in a reception buffer the channels and the pieces of synchronization information received via the second carrier;
upon receiving, via the first carrier, a first set of channels associated with a given piece of synchronization information:
extracting from said reception buffer a second set of channels being supplied with said given piece of synchronization information; and
rebuilding a frame of said multi-channel data stream from said first and second sets;
determining a first piece of feedback information relative to a transmission timing relationship between said first and second carriers; and
transmitting said first piece of feedback information to said first tunnel end-point.

8. The method according to claim 7, wherein said first piece of feedback information is a piece of information on a transmission jitter between said first and second carriers.

9. The method according to claim 7, wherein said first piece of feedback information is a piece of information on a time period between an instant of reception by the second tunnel end-point of said first set of channels and an instant of reception by the second tunnel end-point of said second set of channels.

10. The method according to claim 7, wherein the second tunnel end-point further performs the steps of:
determining a second piece of feedback information pertaining to a loss rate over the second carrier by comparing a number of frame portions of the multi-channel stream received via the first carrier and a number of frame portions of the multi-channel stream received via the second carrier; and
transmitting said second piece of feedback information to said first tunnel end-point.

11. A non-transitory computer-readable storage medium, storing a computer program comprising a set of instructions that can be executed by a computer in order to implement a method for transmitting a multi-channel data stream comprising frames comprising a plurality of channels, the transmitting being performed via a multi-transport tunnel from a first tunnel end-point to a second tunnel end-point, said tunnel implementing at least one first carrier supporting a transport protocol with acknowledgement and at least one second carrier supporting a transport protocol without acknowledgement,
wherein the first tunnel end-point performs the steps of:
determining, for each channel of a given frame of the multi-channel data stream received by the first tunnel end-point, based on a predetermined routing criterion, whether the channel is to be routed to the first carrier or to the second carrier of the multi-transport tunnel;
routing channels of the frame of said multi-channel data stream determined in the determining step to be routed to the first carrier said first carrier of the multi-transport tunnel and routing channels of the frame of said multi-channel data stream determined in the determining step to be routed to the second carrier to the second carrier of the multi-transport tunnel;
supplying one piece of synchronization information with said channels;
obtaining a first piece of feedback information relative to a transmission timing relationship between said first and second carriers; and
applying a delay before transmitting said channels routed to the first carrier, said delay being determined as a function of said first piece of feedback.

12. A non-transitory computer-readable storage medium, storing a computer program comprising a set of instructions that can be executed by a computer in order to implement a method for transmitting a multi-channel data stream comprising frames comprising a plurality of channels, the transmission being performed via a multi-transport tunnel from a first tunnel end-point to a second tunnel end-point, said tunnel implementing at least one first carrier supporting a transport protocol with acknowledgement and at least one second carrier supporting a transport carrier without acknowledgement,
wherein the second tunnel end-point performs the steps of:
receiving, via the first and second carriers, channels of said multi-channel data streams as well as pieces of synchronization information supplied with said channels, the channels of one frame of said multi-channel data stream being supplied with one piece of synchronization information by the first tunnel end-point, wherein for each received channel, said first tunnel end-point determines, for each channel of a given frame of the multi-channel data stream, based on a predetermined routing criterion, whether the channel is to be routed to the first carrier or to the second carrier of the multi-channel transport tunnel, and wherein the first tunnel end-point routes channels of a frame determined to be routed to the first carrier to the first carrier of the multi-channel transport tunnel and routes channels of a frame determined to be routed to the second carrier to the second carrier of the multi-channel transport tunnel, and supplies the one piece of synchronization information with the channels;
storing in a reception buffer the channels and the pieces of synchronization information received via the second carrier;
upon receiving, via the first carrier, a first set of channels associated with a given piece of synchronization information:
extracting from said reception buffer a second set of channels supplied with said given piece of synchronization information; and
rebuilding a frame of said multi-channel data stream from said first and second sets;
determining a first piece of feedback information relative to a transmission timing relationship between said first and second carriers; and
transmitting said first piece of feedback information to said first tunnel end-point.

13. A first tunnel end-point participating in a transmitting of a multi-channel data stream comprising frames comprising a plurality of channels, the transmitting being performed via a multi-transport tunnel from a first tunnel end-point to a second tunnel end-point, said tunnel implementing at least one first carrier supporting a transport protocol with acknowledgement and at least one second carrier supporting a transport protocol without acknowledgement, wherein said first tunnel end-point comprises:
determining means for determining, for each channel of a given frame of the multi-channel data stream received by the first tunnel end-point, based on a predetermined routing criterion, whether the channel is to be routed to the first carrier or to the second carrier of the multi-channel transport tunnel;
routing means for routing the channels of the frame of said multi-channel data stream determined by the determining means to be routed to the first carrier said first carrier of the multi-transport tunnel and routing channels of the frame of said multi-channel data stream determined by the determining means to be routed to the second carrier to the second carrier of the multi-transport tunnel;
supplying means for supplying one piece of synchronization information with said channels;
obtaining means for obtaining a first piece of feedback information relative to a transmission timing relationship between said first and second carriers; and
applying means for applying a delay before transmitting said channels routed to the first carrier, said delay being determined as a function of said first piece of feedback information.

14. The first tunnel end-point according to claim 13, wherein said first piece of feedback information is a piece of information on a transmission jitter between said first and second carriers.

15. The first tunnel end-point according to claim 13, wherein said first piece of feedback information is a piece of information on a time period between an instant of reception by the second tunnel end-point via the second carrier of a first set of channels and an instant of reception by the second tunnel end-point via the first carrier of at least one second set of channels, the channels of said first and second sets being associated with one piece of synchronization information.

16. The first tunnel end-point according to claim 15, further comprising comparison means for comparison of said time period with a predetermined threshold and enabling said applying means for applying a delay:
not to apply a delay before transmission if said time period is above said predetermined threshold; and
to apply a delay before transmission equal to the sum of the absolute value of said time period and of said predetermined threshold if the time period is below or equal to said predetermined threshold.

17. The first tunnel end-point according to claim 13, further comprising:
- obtaining means for obtaining a second piece of feedback information representing a loss rate over the second carrier or a retransmission rate over the first carrier; and
- withdrawing means for withdrawing frames routed to the second carrier as a function of said second piece of feedback information.

18. The first tunnel end-point according to claim 13, wherein the piece of synchronization information supplied with a channel is a piece of time-stamp information extracted from said multi-channel data stream.

19. A second tunnel end-point participating in a transmitting of a multi-channel data stream comprising frames comprising a plurality of channels, the transmitting being performed via a multi-transport tunnel from a first tunnel end-point to a second tunnel end-point, said tunnel implementing at least one first carrier supporting a transport protocol with acknowledgement and at least one second carrier supporting a transport carrier without acknowledgement,
wherein said second tunnel end-point comprises:
- receiving means for receiving, via the first and second carriers, channels of said multi-channel data stream as well as pieces of synchronization information supplied with said channels, the channels of one frame of said multi-channel data stream being supplied with one piece of synchronization information by the first tunnel end-point, wherein for each received channel, said first tunnel end-point determines, for each channel of a given frame of the multi-channel data stream, based on a predetermined routing criterion, whether the channel is to be routed to the first carrier or to the second carrier of the multi-channel transport tunnel, and wherein the first tunnel end-point routes channels of a frame determined to be routed to the first carrier to the first carrier of the multi-channel transport tunnel and routes channels of a frame determined to be routed to the second carrier to the second carrier of the multi-channel transport tunnel, and supplies the one piece of synchronization information with the channels;
- storing means for storing, in a reception buffer, the channels and the pieces of synchronization information received via the second carrier;
- extracting means for extracting from said reception buffer a second set of channels being supplied with said given piece of synchronization information, upon receiving, via the first carrier, a first set of channels associated with a given piece of synchronization information;
- rebuilding means for rebuilding a frame of said multi-channel data stream from said first and second sets;
- determining means for determining a first piece of feedback information relative to a transmission timing relationship between said first and second carriers; and
- transmitting means for transmitting said first piece of feedback information to said first tunnel end-point.

20. The second tunnel end-point according to claim 19, wherein said first piece of feedback information is a piece of information on a transmission jitter between said first and second carriers.

21. The second tunnel end-point according to claim 19, wherein said first piece of feedback information is a piece of information on a time period between an instant of reception by the second tunnel end-point of said first set of channels and an instant of reception by the second tunnel end-point of said second set of channels.

22. The second tunnel end-point according to claim 19, further comprising:
- determining means for determining a second piece of feedback information pertaining to a loss rate over the second carrier by comparing with a number of frame portions of the multi-channel stream received via the first carrier and a number of frame portions of the multi-channel stream received via the second carrier; and
- transmitting means for transmitting said second piece of feedback information to said first tunnel end-point.

23. The method according to claim 1, wherein the predetermined routing criterion comprises an importance level that the channel be transmitted without loss.

24. The method according to claim 1, wherein the multi-channel data stream comprises an audio stream comprised of a plurality of channels each respectively corresponding to one of a plurality of speakers.

* * * * *